Sept. 19, 1961  R. F. PURNELL  3,000,519
AUTOMATIC SORTATION SYSTEM CONTROL
Filed Sept. 23, 1958  8 Sheets-Sheet 1

INVENTOR
Richard F. Purnell
By- John C. Black
Attorney

INVENTOR
Richard F. Purnell

By John E. Black
Attorney

Sept. 19, 1961  R. F. PURNELL  3,000,519
AUTOMATIC SORTATION SYSTEM CONTROL
Filed Sept. 23, 1958  8 Sheets-Sheet 6
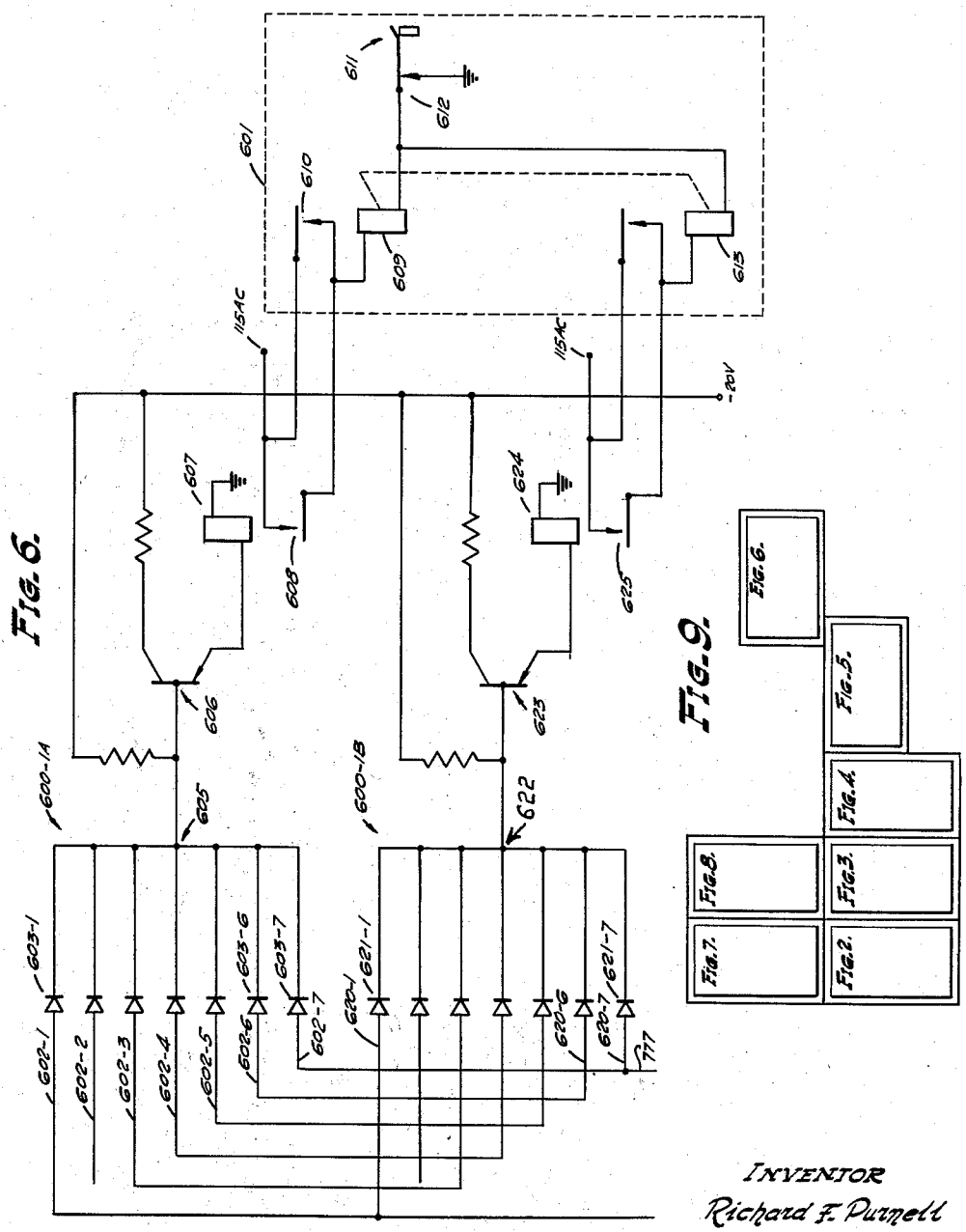
INVENTOR
Richard F. Purnell
By John C. Black
Attorney

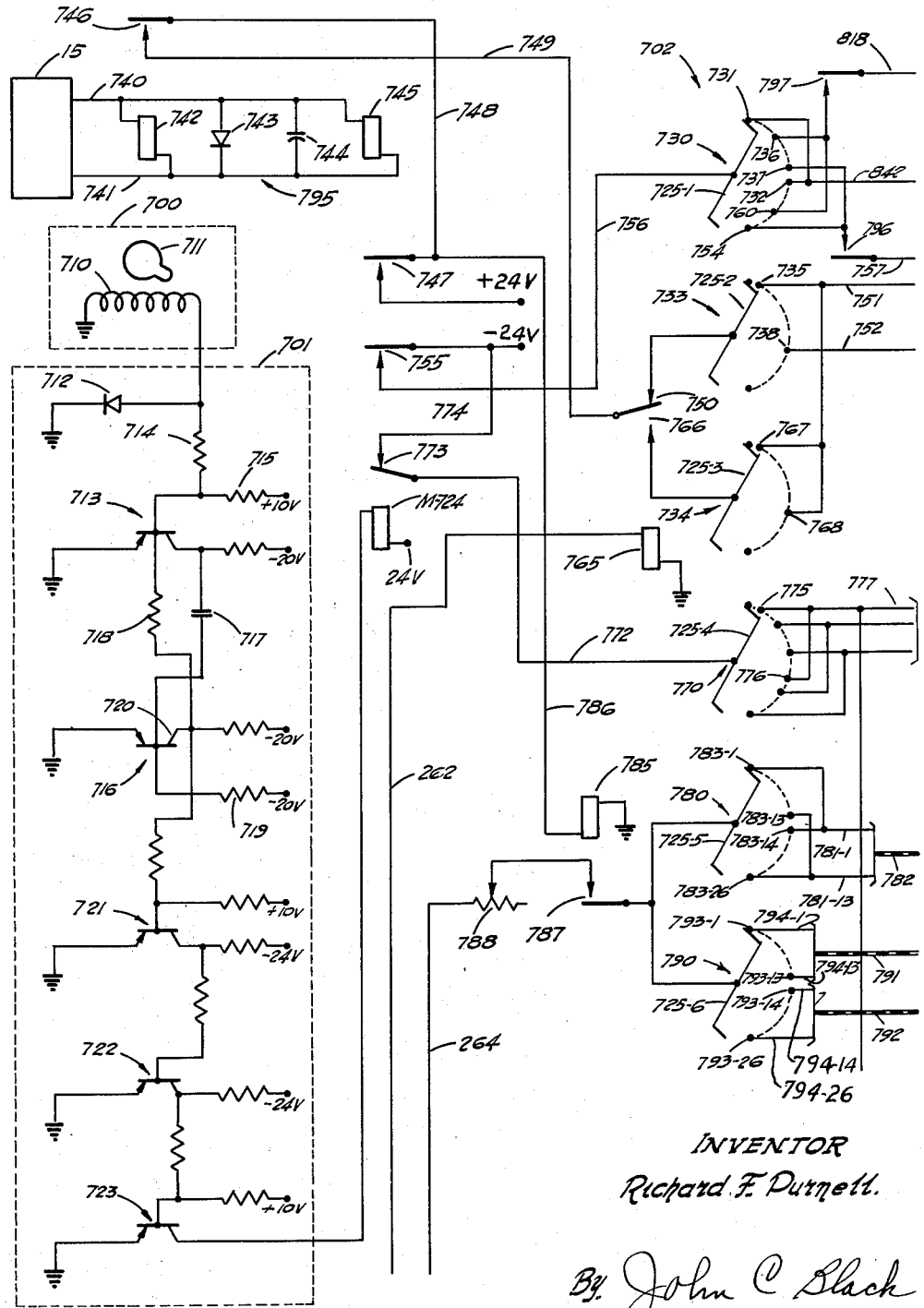

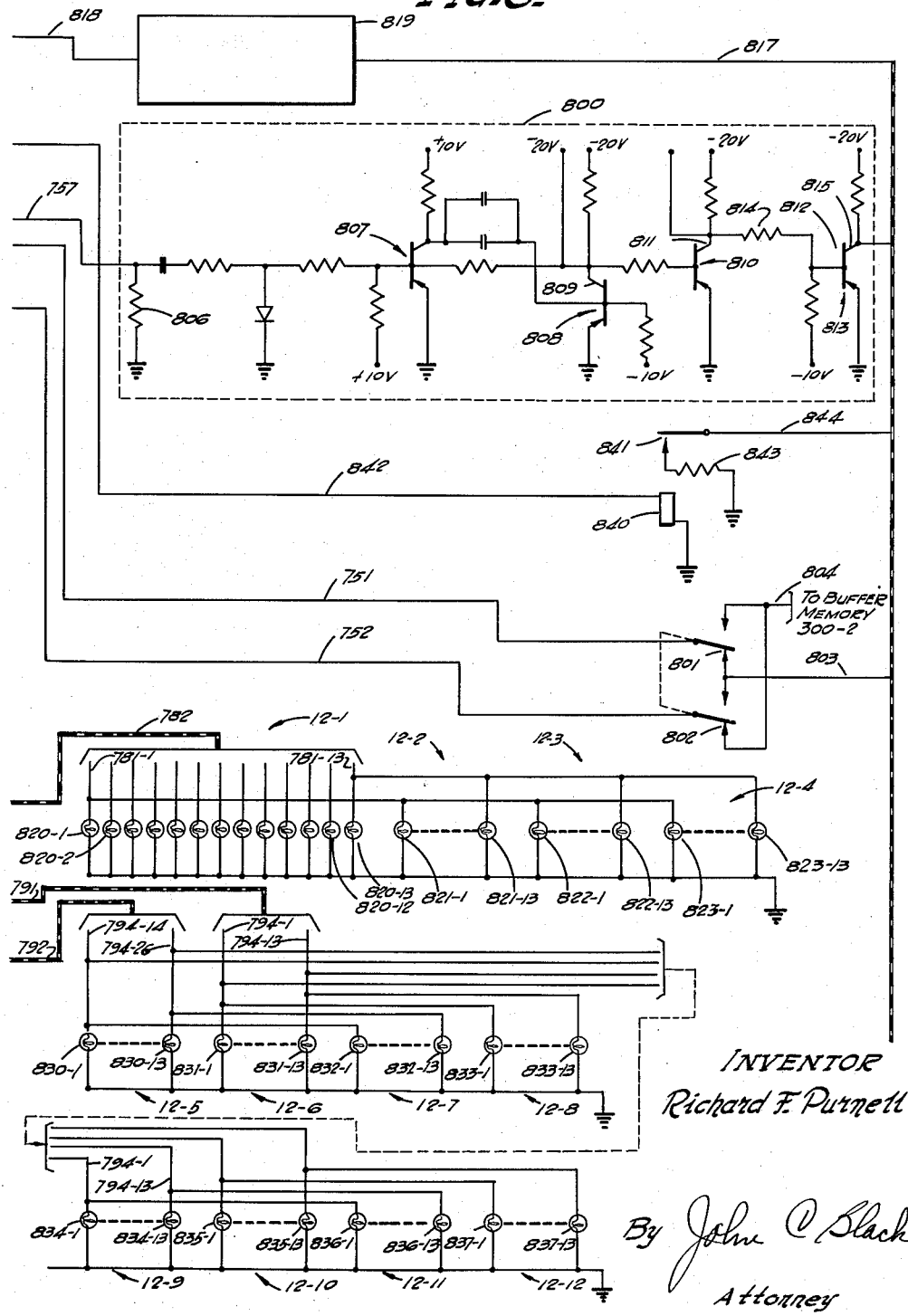

United States Patent Office 3,000,519
Patented Sept. 19, 1961

3,000,519
AUTOMATIC SORTATION SYSTEM CONTROL
Richard F. Purnell, Hinsdale, Ill., assignor to Stewart-Warner Corporation, Chicago, Ill., a corporation of Virginia
Filed Sept. 23, 1958, Ser. No. 762,782
21 Claims. (Cl. 214—11)

The present invention relates to systems for automatically controlling the sortation of objects and more particularly to an automatic conveyor control system.

During the past decade, we have seen the value of human labor steadily rise. As a consequence of this, labor costs have also been increasing at a steady rate. This increase has been even more noticeable in the area of unskilled labor of the type used in various handling and sorting operations. Industries which employ a large staff of personnel working primarily in handling and sorting are looking to automatic means to ease their burden from a financial standpoint. Automatic sorting, where packages are discharged automatically into groups according to their selected destination, is becoming financially feasible in a steadily increasing number of applications as each year passes.

An examination of automatic sorting systems now in use reveals that most of the systems are of a relatively simple nature, comprising only a few sorts and having very few items in the system at one time. The control for these systems is primarily mechanical and, although quite ingenious in some cases, is limited to small systems.

As the desired sorting system becomes larger, it has been necessary to change the method of control to one involving electrical relays. As still more size and complexity was added to systems, magnetic tape has been resorted to in a few installations. These magnetic tape installations are subject to excessive wear and breakage. They are made as a simple analogue of the conveyor.

Industries such as the railroads, which are chiefly material handlers, are now looking to automation to help solve some of their major problems. The railroads handle and sort a very large quantity of mail and parcel post. These mail bags and parcels are sorted primarily by hand at the present time, and the quantities are so large and the sorts so numerous that the control problem becomes a difficult one. The prior art systems have been found to be inadequate. A type of control is needed which will be rugged and trouble free. It must also be extremely versatile so that it is applicable to a variety of systems of a complicated nature.

Accordingly, the present invention has been particularly adapted to solve the many difficult problems facing the railroads in their mail and parcel post handling locations; however, it is to be understood that the present invention is not to be so limited and that it may be adapted readily to the control of conveyor and materials handling systems generally.

In order to provide ease of description, it will be assumed that the present invention is being utilized to replace or supplement an existing mail and parcel post sorting installation in a major metropolitan area. This installation is owned and operated by a major railroad serving the area. The existing installation utilizes a conveyor belt with one or more persons loading the belt with packages at one end. A plurality of persons manually remove the packages at selected spaced positions along the belt. Each of these positions identifies an area adjacent a spur track having a freight car which is to be utilized to transport packages to a predetermined destination.

With respect to this one installation, the United States and all foreign countries of the world must be divided into areas determined by the available railroad facilities and the United States Post Office system coordinated therewith. Each of the areas will be assigned a common destination, accessible to the railroad network, to which all of its mail and parcel post packages will be directed. Railroad cars at the installation will be assigned to each of these area destinations. These railroad cars will be directed to the above mentioned positions adjacent the conveyor sorting belt.

In each of these conveyor unloading positions, one or more persons are located to remove packages from the belt for loading on an adjacent car which is to carry the packages to their respective area destination. Thus, in a typical sorting installation, for instance Philadelphia, several of the unloading positions may have cars for each of several medium sized cities in the adjacent localities in southeastern Pennsylvania, New Jersey, Delaware and perhaps Maryland. One person at each unloading station would be responsible for removing packages destined for the respective city from the belt and for placing it on a gravity conveyor extending to the desired car. For a distant major area destination, such as Chicago (which might receive packages for rerouting to all of Illinois) another car, or cars, will be assigned a different position along the belt. However, in this instance, it may be necessary to utilize a position which has a greater temporary storage capacity associated with the gravity conveyor and several persons for handling the packages.

When this manual system is replaced or supplemented with the structure of the present invention, transfer mechanisms located at each of the belt positions adjacent track car positions will automatically remove the mail sacks and parcel post packages. In order to accomplish this, each of the geographic areas and its respective common destination will be assigned a predetermined address code. The address code for each package (or mail sack) will be placed into an electronic control apparatus by an operator subsequent to its placement on the belt; and, when the package reaches a belt position at which it is to be removed, a transfer mechanism will automatically remove the package from the belt and place it upon the desired gravity conveyor.

It will be appreciated that extreme flexibility in the control apparatus is necessary to permit complete flexibility in the associated railroad track system. It is necessary that railroad cars destined to any one of the many geographic areas be permitted routing to any one of the number of tracks terminating at the unloading positions adjacent the conveyor belt. Due to the complexity of railroad connections and schedules from day to day, and for that matter on any given day, it is not feasible to always route cars destined for one geographic area to the same location adjacent the conveyor belt. In order to permit such flexibility, the present invention provides a means whereby a fixed address code assigned to a particular geographic area may be translated into a second code corresponding to a transfer mechanism at any one of the unloading positions adjacent the belt. Translation of a geographic area code from one transfer mechanism code to another is accomplished by the simple expedient of a modular type translator with plug-in code forming units.

In the preferred embodiment, the packages are loaded manually on the belt with their addresses facing upwardly. The addresses are read by operators adjacent the loading area and recorded in the control apparatus. The address codes are advanced to succeeding positions in the control apparatus coincident with the movement of the respective packages along the conveyor path. When the packages reach the respective positions at which they are to be removed, address code detecting equipment senses the presence of the respective address codes and initiates the operation of the desired transfer mechanisms to selectively remove the packages from the belt.

To overcome the numerous inadequacies of the prior art systems, the present invention utilizes a unique overall arrangement of electronic control apparatus which insures extreme flexibility, simplicity of maintenance, and unusually reliable operation. At the same time, the present invention makes use of a unique and trouble free, high capacity information system for routing objects to any one of a number of transfer positions along a conveyor belt. The system is characterized by a stationary, trouble free analogue of the moving belt. Instead of requiring moving parts as have prior art systems, the present analogue utilizes stationary multi-digit information storage stages and the transfer of information from stage to stage by means of electric pulses.

By utilizing the electronic circuitry disclosed herein, the speed of which is phenomenally faster than the movement of the objects on the conveyor belt, timing problems in the control apparatus are reduced to a minimum. The only remaining limitations from a time standpoint are dictated primarily by the speed at which transfer mechanisms can remove packages from the belt and be prepared for subsequent operation to remove a next succeeding package. Another limitation is the speed at which packages may be loaded upon the belt either manually or automatically and the speed at which the routing information for each package may be entered manually or automatically into the electronic control apparatus.

Improved transistorized circuitry has been utilized to provide a unique yet simple and trouble free operation as well as to provide a rugged and compact installation.

Accordingly, it is a primary object of the present invention to provide an improved electronic package sortation system which permits extreme flexibility and reliability. At least a portion of the flexibility is assured by the adaptability of electronic, transistorized equipment to modular construction. In the present system, the transistorized circuitry may be entirely modular with plug-in circuit boards which are easily checked for faults and easily replaced by similarly constructed modules. By means of plug-in modular construction techniques for applying routing information to the control circuitry, fixed unchangeable keyboard codes may be assigned for known destinations, even though the conveyor path transfer point may from time to time vary for such destination.

It is another primary object of the present invention to provide a main routing information storage device synchronized with conveyor movement, a non-synchronous routing information storage device, and unique circuits correlating the functioning of both storage devices thereby to permit a faster, more flexible, and more efficient system.

It is another object of the present invention to provide a unique means for marking the conveyor belt positions with respect to which objects are to be centered, which means automatically compensates for changes in the length of the belt as it stretches over a period of use. The preferred embodiment includes a bank of lights positioned along the edge of the conveyor belt in the area in which packages are loaded manually on the belt and in which operators enter the routing information of the packages into the control apparatus. Succeeding lights along the conveyor belt path are sequentially lighted to indicate the positions on the conveyor belt with respect to which the packages are to be centered. At the same time, the lighting system is controlled in such a manner as to indicate to a plurality of operators, each of whom enters package routing information into the control apparatus, which packages are to be handled by each operator.

It is another object of the present invention to provide improved timing means for the control circuits.

It is another object of the present invention to provide a conveyor and its control apparatus which permits the removal of packages from either side of the conveyor by a single transfer mechanism.

Other objects and the numerous features of the present invention will be appreciated upon a perusal of the following description taken together with the accompanying drawings in which, FIG. 1 is a diagrammatical representation of a conveyor and its control apparatus;

FIG. 6 shows typical circuits for a decoder and motor control circuit for selectively controlling the operation of a respective transfer mechanism;

FIGS. 7 and 8 show the timing and pulse forming and shaping circuits, and

FIG. 9 is a diagram of assistance to show the arrangement of FIGS. 2–8.

Figure 1:
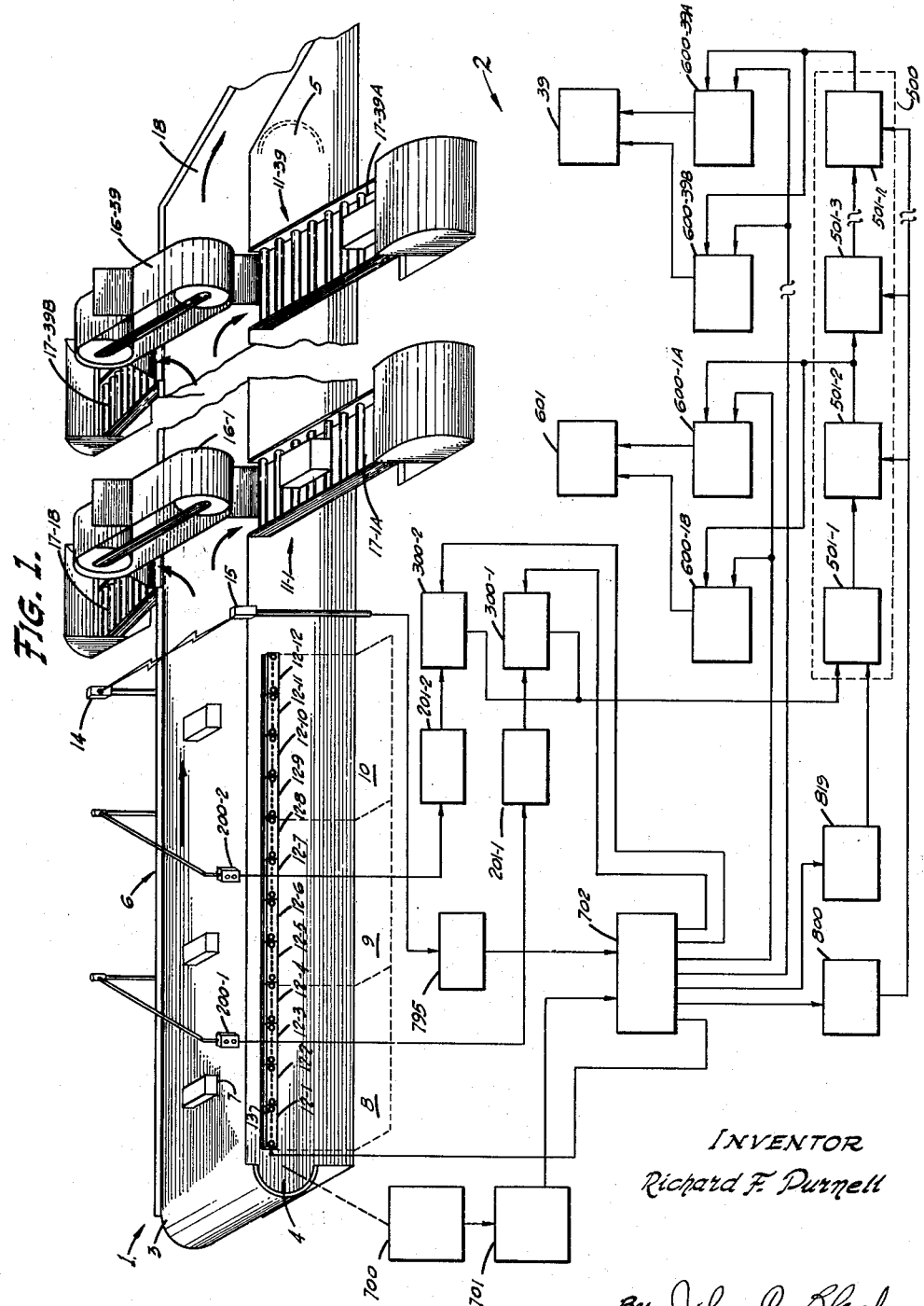

The preferred embodiment, disclosed in FIGS. 1–9 inclusive, comprises a conveyor 1 (FIG. 1) and control apparatus 2. The conveyor 1 includes an endless belt 3 carried by a pair of spaced rotatable assemblies 4 and 5. One of the assemblies 4 or 5 is connected to a prime mover (not shown) which rotates the assembly to cause the upper portion of the belt to be moved along the path 6 from left to right with respect to FIG. 1. The conveyor path 6, as it progresses from left to right, is divided into a plurality of areas in which different functions are performed. Thus, packages 7 are placed on the belt 3 at a loading area 8, move past a pair of marking areas 9 and 10, and thence through a discharge area comprising a plurality of discharge stations 11–1 to 11–39.

The loading area 8 and the marking areas 9 and 10 include banks of lamps 12–1 to 12–12 inclusive. Each bank of lamps, 12–1 to 12–4 includes a plurality of lamps 13 which are energized sequentially in synchronism with the movement of the belt 3 to indicate a belt position with respect to which a package is to be centered by an operator in the loading area 8. The lamps in the marking areas 9 and 10 are energized sequentially in such a fashion as to indicate to operators in the marking areas which packages are intended for individual handling by them.

Keyboards 200–1 and 200–2 are provided respectively for the operators in the marking areas 9 and 10. These keyboards are utilized by the operators to insert or write into the control apparatus 2 coded information corresponding to the destination of the packages 7. The keyboards are preferably movable along the conveyor path so that the operators have more freedom of movement to follow packages with addresses which are difficult to read.

A lamp 14 and a photosensitive device 15 are provided intermediate the marking area 10 and the first discharge station 11–1 to detect the presence of packages 7 on the belt 3 which are approaching the discharge station.

The discharge station 11–1 includes a transfer mechanism 16–1. The mechanism 16–1 may be operated in either direction to discharge packages from the belt 3 to gravity conveyors 17–1A and 17–1B disposed on opposite sides of the belt. Each of the other discharge stations include similar transfer devices and gravity conveyors on one or both sides of the belt 3. Hence, station 11–39 includes a transfer mechanism 16–39 and gravity conveyors 17–39A and 17–39B. An additional chute 18 is provided at the end of the conveyor to receive packages which were not removed at any of the discharge stations. For example, a defective decoder may fail to operate its associated transfer mechanism.

As indicated above, the keyboards 200–1 and 200–2 are provided for writing address codes, corresponding to the packages, into the control apparatus 2. The keyboard codes are in decimal form, i.e., 1 to 50; however, the apparatus 2 is adapted to handle coded information in digital form rather than in decimal form. Consequently, a means must be provided for changing the address codes from the decimal to the digital form.

This is conveniently provided for in distribution plug units 201–1 and 201–2, to which the keyboards are connected. In the preferred embodiment, a six bit digital code is utilized to handle the fifty differing address codes. Each distribution plug unit such as 201–1 includes a distribution board, to be described later, for each decimal address code formed by the keyboard 200–1. These boards are of a plug-in type so that the binary code corresponding to a decimal code may be easily changed.

Buffer memory units 300–1 and 300–2 are connected respectively to the outputs of the distribution plug units 201–1 and 201–2. The buffer memory units are utilized for temporarily storing the binary address codes of alternate packages 7 until the packages arrive at a position adjacent the first discharge station 11–1. The packages are then detected by the photosensitive device 15 and their corresponding address codes are transferred from the respective buffer memory units into a main memory unit 500.

The main memory 500 comprises a multi-stage shift register with certain of its stages corresponding to the various discharge stations. Thus shift-register stage 501–2 corresponds to the discharge station 11–1 and stage 501–N to station 11–39. As the packages proceed along the conveyor path 6 past succeeding transfer stations, their corresponding address codes are shifted from stage to stage in the memory unit 500. Decoders, such as 600–1A, are connected to the outputs of each shift register stage which corresponds to a transfer station. The decoders examine the address codes shifted into their associated shift register stages and cause a transfer mechanism to be operated in the event that the address code indicates that the package is to be removed at the discharge station corresponding to the decoder and main memory stage.

The timing for the various operations of the control apparatus 2 is provided by means of a clock pulse generator 700, a clock pulse amplifier 701, and a master timing switch 702. Control pulses for certain of the main memory operations are amplified and properly shaped by a zone pulse amplifier 800 and a reset pulse amplifier 819.

*Keyboard 200–1*

The keyboard 200–1 (FIG. 2) is similar to commercially available devices and will be described only briefly. The keyboard 200–1 includes two rows of manually operable keys 210 and 211 for selecting respectively the tens and units digits of a decimal code. In the preferred embodiment, the row 210 is provided with keys 0–4 inclusive and the units row is provided with keys 0–9 inclusive. Accordingly, it will be appreciated that the numerals 00 to 49 inclusive are available. When any one of the tens keys is depressed by an operator, a pair of contacts (not shown) will be closed to connect a common incoming wire to a selected outgoing wire. Thus, when the tens key 4 is depressed, the incoming wire 212 is connected to the outgoing wire 213–4.

When any one of the units keys of the row 211 is depressed, it actuates five contacts (not shown) to engage five conductor busses (not shown). Each buss is connected to one of the five incoming wires 213–0 to 213–4 from the tens row of keys 210. Each of the five contacts is connected to an individual outgoing conductor. Thus, if subsequent to the depression of the tens key 4, the units key 9 is depressed, the conductor 212 will be connected to the conductor 214–49 by way of the tens key 4, the conductor 213–4, and the units key 9. Similarly, the conductor 212 may be connected to any one of the 50 conductors 214–00 to 214–49 by way of the tens row of keys 210 and the units row of keys 211.

The keys in each of the rows are mechanically interlocked to prevent a simultaneous depression of more than one key. Each of the wires 214–00 to 214–49 are connected to a respective distribution board in a distribution plug unit 201–1. For example, the wire 214–49 is connected to a distribution board 215 by way of a socket 216 and a mating plug 217. Each distribution board, such as 215, includes a circuit for forming a six bit binary code. Thus board 215 includes a first group of terminals 218 and a second group of terminals 219. From top to bottom, the terminals in each group represent succeeding positions in the binary code. The third terminals in each group 218 and 219 are connected with each other by way of conductors 220 and 221 and a diode 222. Thus, the board 215 forms a binary code 001100. A second board 225 forms the binary code 011000. The terminals 219 of the board 215 are connected to conductors 231 to 236 inclusive by way of plug and socket assemblies 237. The output terminals such as 219 of each of the distribution boards in the unit 201–1 are multipled with the conductors 231–236.

Each digital code number or address code corresponds to one of the gravity conveyors and its transfer mechanism. Each decimal number of the keyboard 200–1 is indicative of a predetermined shipping destination for a particular geographical area. It will be seen that, since the distribution boards, such as 215, are replaceable, it is possible to change the discharge station and/or gravity conveyor at which packages destined for a certain shipping destination are to be removed. This is accomplished by merely inserting a new board with the address code corresponding to the desired gravity conveyor.

Therefore, it can be appreciated that extreme flexibility is provided for permitting railroad cars destined for a particular shipping destination to be brought alongside any one of the gravity conveyors such as 17–1A associated with the main sorting conveyor 1.

Figure 3:
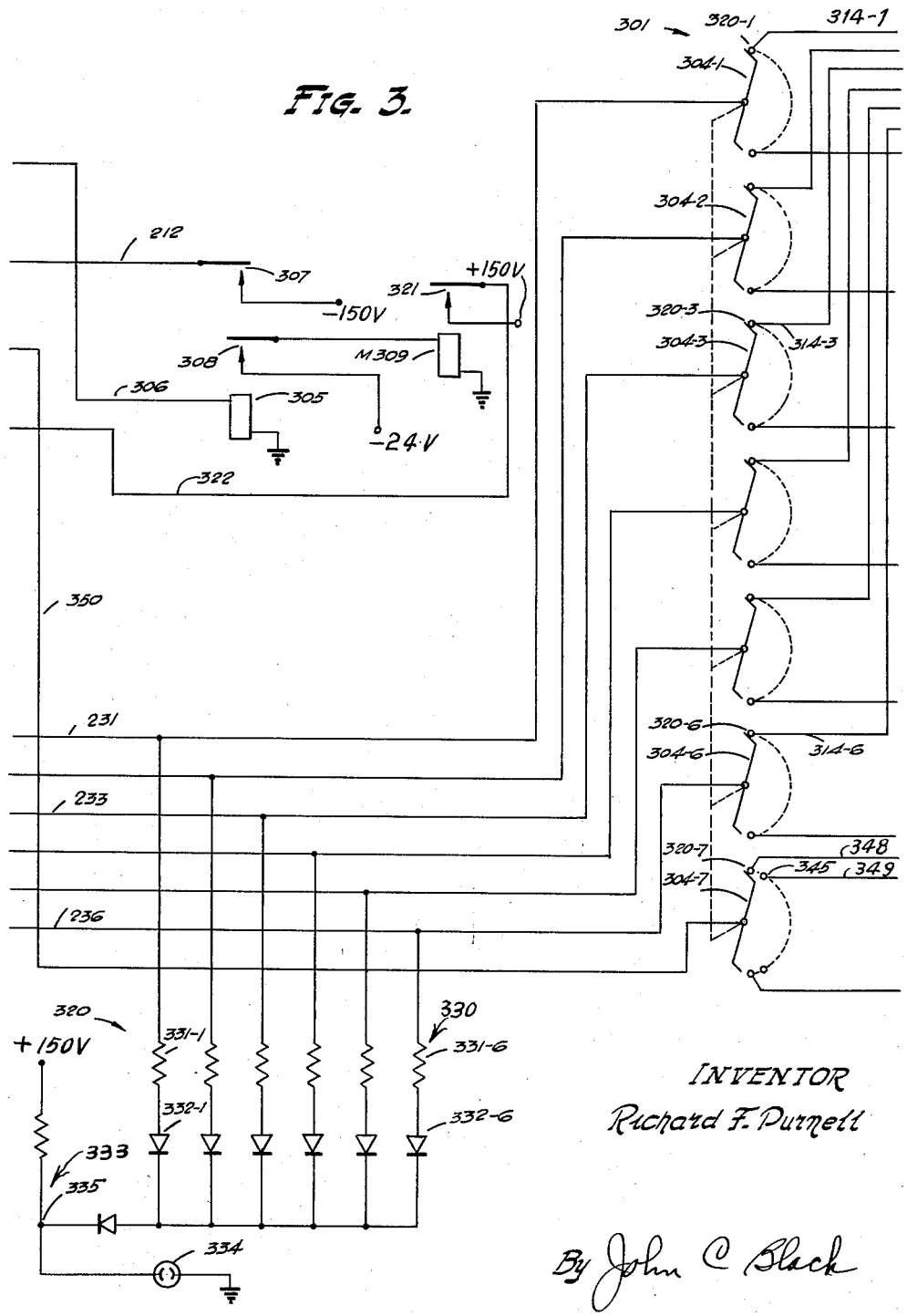
FIGS. 3 and 4 show representative circuits of a buffer memory unit for temporarily storing routing information.
Figure 4:
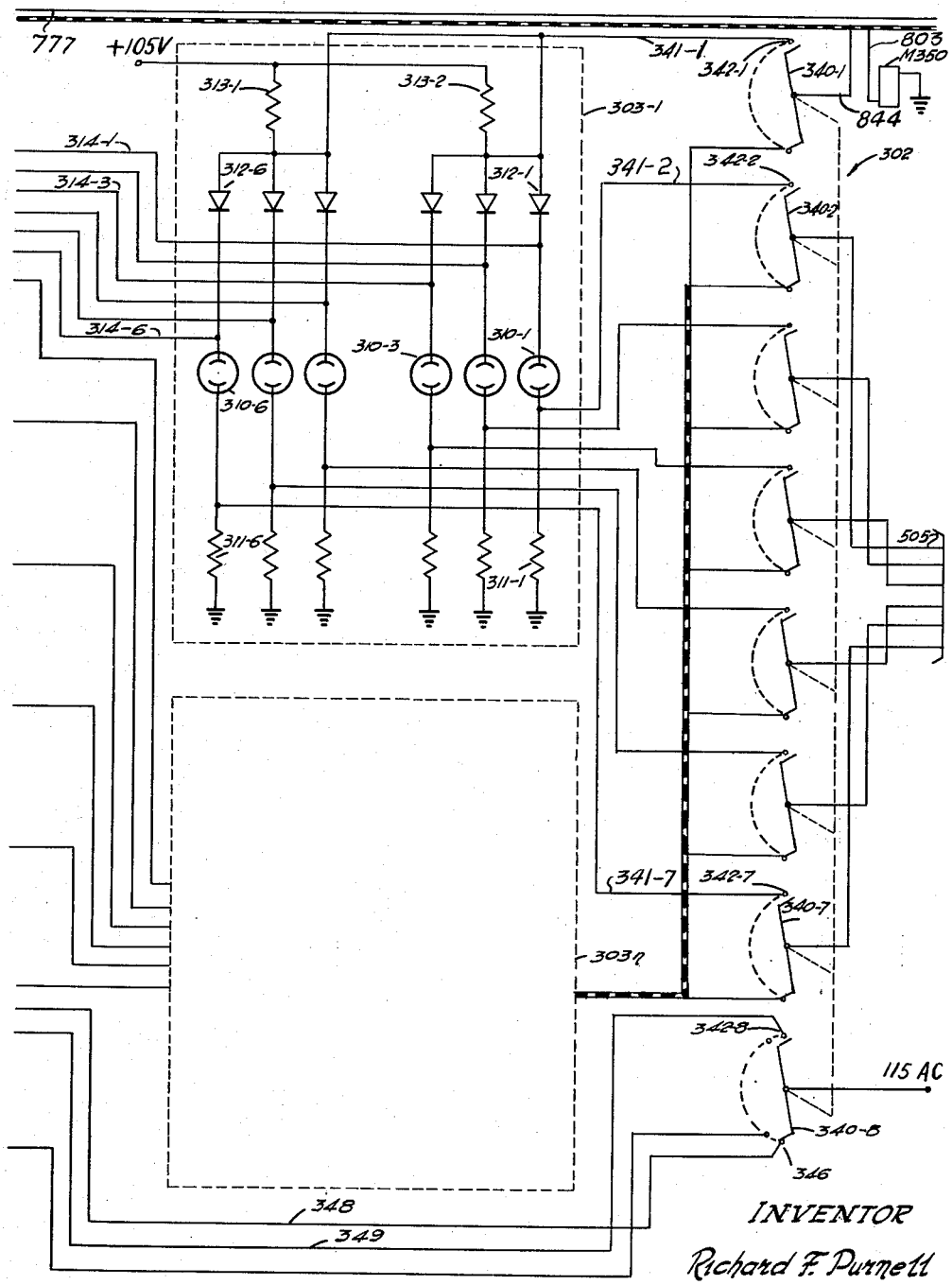

Returning to the keyboard 200–1, it can be seen that a conventional enter bar switch 240 is provided for releasing the tens and units keys after they have been depressed and for causing the selected digital address code to be transferred to a buffer memory unit 300–1 (FIGS. 3 and 4). The enter bar switch 240 also causes a next succeeding storage device in the buffer memory to be connected to the distribution unit 201–1 after the selected address code has been transferred thereto. This will be described in more detail later. The release of the tens and units keys is accomplished in a well known manner by means of release coils 241. A pair of conveyor "start" and "stop" switches 242 are provided at the keyboard 200–1.

*Buffer memory unit 300–1*

A buffer memory unit 300–1 (FIGS. 3 and 4) comprises a read-in selector stepping switch 301, a read-out selector stepping switch 302 and a plurality of storage sections 303–1 to 303–n.

The storage section 303–1 comprises a group of six neon tubes 310–1 to 310–6. The lower electrodes of the neon tubes are connected to ground potential by way of resistors 311–1 to 311–6. The upper electrodes of the neon tubes are connected to a positive holding potential by way of diodes 312–1 to 312–6 and resistors 313–1 and 313–2. The upper electrodes of the neon tubes are also connected respectively to the first contacts 320–1 to 320–6 of the top six levels of the read-in switch 301 by way of conductors 314–1 to 314–6. With this circuit, a neon tube will be fired if a positive D.C. voltage greater than approximately 130 volts is applied to its corresponding lead such as 314–1. The holding potential of 105 volts D.C. will maintain the neon in the conducted state subsequent to firing.

The above described conductors 231 and 236 inclusive in the distribution plug unit 201-1 are connected respectively to the wipers 304-1 to 304-6 of the top six levels of the read-in switch 301. The enter bar switch 240 described above connects a minus 24 volt potential to an operate relay 305 in the buffer memory unit 300-1 by way of conductor 306 to complete an obvious circuit for operating the relay.

When the relay 305 energizes, it closes contacts 307 to complete a circuit for writing a selected digital address code into the storage unit to which the wipers 304-1 to 304-6 are connected. Thus, with the connections shown in FIGS. 2, 3, and 4 and with the tens key 4 and the units key 9 depressed, relay 305 completes a circuit from a positive 150 volt D.C. potential through contacts 307, conductor 212, the depressed tens key 4, conductor 213-4, the depressed units key 9, conductor 214-49, socket 216, plug 217, conductor 220, diode 222, conductor 221, socket assembly 237, conductor 233, wiper 304-3, contact 320-3, conductor 314-3, to the neon tube 310-3 to fire the tube. Since none of the other terminals 218 or 219 in the distribution board 215 (FIG. 2) are connected, only the tube 310-3 is ignited. Thus, the address code 001000 is stored in the unit 303-1.

When the relay 305 energizes as described above, it also closes contacts 308 to energize the stepping magnet M309 of the read-in switch 301. The switch 301 is a conventional non-homing selector stepping switch which advances its wipers one step incident to the deenergization of its magnet M309.

When the magnet M309 energizes, it closes contacts 321 to complete an obvious circuit including conductor 322 for operating the above described release coils 241 (FIG. 2) for releasing the depressed tens and units keys of the keyboard 200-1. The interval of time between the initial energization of the relay 305 and the subsequent energization of the release coils 241 is more than sufficient for writing the selected address code into the storage unit 303-1 before the release of the units and tens keys. When the magnet M309 deenergizes, the wipers 304-1 to 304-7 are advanced to the next accessible contacts.

It will be recalled that a positive voltage somewhat less than 150 volts applied to the conductors 314-1 to 314-6 will fire the corresponding neon tubes. Attention is directed again to the distribution plug unit 201-1. The 150 volt potential was applied by way of the diode 222 to the conductor 233. Note that, in the distributor board 225, the diode 244 is also connected to the conductor 233 and, therefore, to the positive 150 volt D.C. potential, although its polarity is such that the diode 244 should not conduct. However, it is well known that semi-conductors of the type contemplated herein have a reverse to forward resistance ratio in the order of 100:1. Thus, there will be a current flow in the reverse direction through the diode 244 if a circuit is completed. The diode 244 is connected to a second diode 243 and thence to the conductor 234. Therefore, a low positive potential will also be applied to conductor 234 when the 150 volt source is connected directly to the conductor 233 by way of diode 222. It will be appreciated that when, as in the present embodiment, as many as 50 distribution boards are connected and utilized for the various required address codes, that the number of circuits such as the one described above, will be considerably high in number. Each one of these circuits will be in parallel with several others; and, in some instances, a voltage considerably higher than 100 volts will apply to one of the conductors 231 to 236 to cause the erroneous firing of a buffer memory neon tube.

In order to obviate any erroneous firing of the neon tubes in the manner described above, a clamping circuit 330 is provided. The circuit 330 includes series connected resistances and diodes 331-1 to 331-6 and 332-1 to 332-6 interposed between respective ones of the conductors 231 to 236 and a positive supply potential of 100 volts. The diodes 332-1 to 332-6 are connected such that positive volts applied to any one of the conductors 231 to 236 by way of the above described feedback circuits will be reduced to the positive 100 volt supply. However, they will not prevent the firing of a neon tube when the positive 150 volt supply is connected directly to the conductors 231-236. In order to maintain the potential connected to the diodes 332-1 to 332-6 constant, a voltage regulator circuit 333 is provided. The circuit 333 includes a gaseous discharge tube 334 which will pass more or less current to maintain the junction 335 at plus 100 volts.

The operation of the read-out selector switch 302 will now be described. In the event that there are no packages between the marking zone 9 and the first transfer station 11-1 with address codes inserted into the control system 2, then the wipers 340-1 to 340-7 of the switch 302 will be lagging the wipers 304-1 to 304-7 of the switch 301 by one position. In the event that there are such packages between the marking station 9 and the discharge station 11-1, then the wipers 340-1 to 340-7 will lag the wipers 304-1 to 304-7 by a number of positions corresponding to one greater than the number of packages.

The wipers 340-1 to 340-7 have access to each of the storage devices 301-1 to 303-n by way of succeeding contacts engageable by the wipers. The wipers 340-2 to 340-7 are connectable with the lower electrodes of the tubes 310-1 to 310-6 respectively. The conducting or nonconducting state of the tubes will cause selected voltages (plus 15 volts or ground potential) to be applied to the wipers 340-2 to 340-7 by way of conductors 341-2 to 341-7 and the first position contacts 342-2 to 342-7. In this fashion, address codes can be read out of the storage units such as 303-1.

The wiper 340-1 has access to the upper electrodes of each of the neon tubes 310-1 to 310-6 by way of its first position contact 342-1, conductor 341-1, and diodes 312-1 to 312-6 respectively. The function of the wiper 340-1 and its accessible contact bank is to extinguish conducting neon tubes in each of the storage units 303-1 to 303-n subsequent to the removal therefrom of address codes. This will be described in more detail later.

Wiper 340-8 and its associated contact bank and wiper 304-7 and its associated contact bank are wired in such a fashion as to light a synchronous indicator lamp 250 (FIG. 2) at the keyboard 200-1 under certain conditions. The lamp 250 indicates whether or not the read-in selector switch 301 and the read-out selector switch 302 are properly synchronized with respect to each other for properly reading address codes out of the storage units 303-1 to 303-n at the instant the packages corresponding to the respective codes, enter the first discharge station area 11-1.

In order to accomplish this, the contacts in the bank accessible to wiper 304-7 are wired to contacts in the next succeeding positions which are accessible to wiper 340-8. Hence, the first and second contacts 320-7 and 345 accessible to wiper 304-7 are connected respectively to the last and first contacts 346 and 342-8 accessible to wiper 340-8 by way of conductors 348 and 349 respectively. Therefore, when there is no address code information stored in any of the storage sections 303-1 to 303-n, the wiper 340-8 will lag wiper 304-7 by one position and the lamp 250 will be lit to indicate the synchronized condition of the switches 301 and 302.

*Main memory unit 500*

The main memory unit 500 comprises a transistorized shift register having a plurality of stages 501-1 to 501-n. Each stage, such as 501-1 requires six sections in order to handle the six digit binary numbers of the address codes. Each section is utilized for receiving, storing, and transferring one bit of information in succeeding address codes. Hence, each stage, such as 501-1, will receive, store, and advance the six bits of information in each address code. Each section of each of the stages 501-2 to 501-n will be identical in their makeup. However, inasmuch as the first stage 501-1 receives information from a differing type of storage device (the neon tubes of the buffer memories 300-1 and 300-2), each section of the stage 501-1 must have a circuit configuration slightly different from the sections of the other stages.

Figure 5:
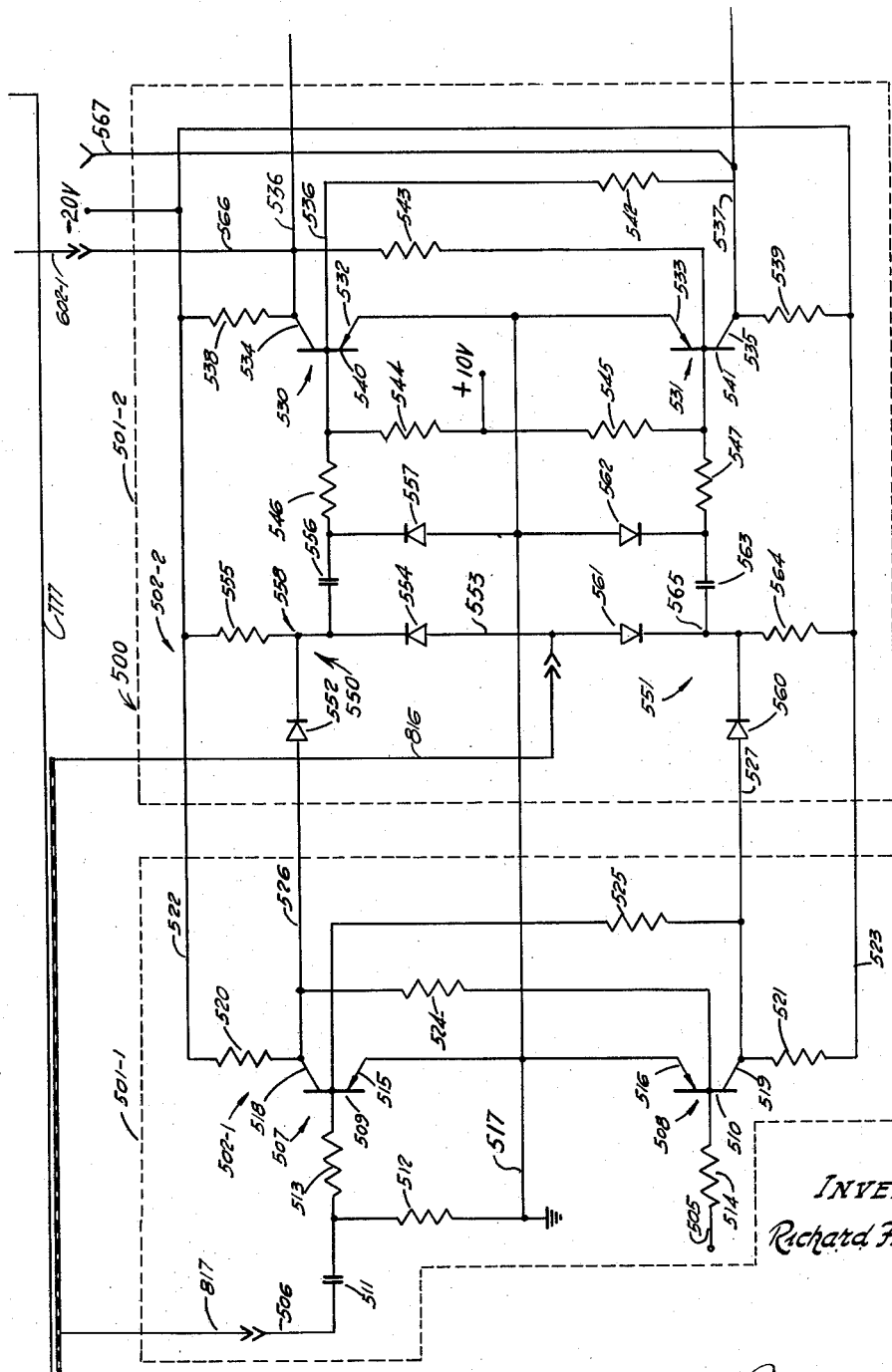
FIG. 5 shows representative circuits of a main memory unit for storing routing information.

FIG. 5 shows the circuits for typical sections 502-1 and 502-2 of the first and second stages 501-1 and 501-2. Section 502-1 of the stage 501-1 has its output connected to the input of section 502-2 of stage 501-2. One input conductor 505 of the section 502-1 is connected to a corresponding one of the wipers 340-2 to 340-7 of the readout selector switch 302 of FIG. 4. The other input conductor 506 of the section 502-1 is connected to a reset pulse amplifier circuit of FIG. 8 which will be described in detail later.

The section 502-1 includes a pair of transistors 507 and 508 which are connected to form a bistable flip-flop circuit. The transistors 507 and 508 comprise a pair of bases 509 and 510. The base 509 is connected to the reset pulse input conductor 506 by way of a differentiating circuit including the capacitor 511 and the resistor 512 and by way of a current limiting resistor 513. The base 510 is connected to the information input conductor 505 by way of a current limiting resistor 514.

The transistors 507 and 508 include a pair of emitters 515 and 516 which are connected to ground potential by way of conductor 517. The transistors also include a pair of collectors 518 and 519 which are connected to a negative 20 volt supply by way of load resistors 520 and 521 and conductors 522 and 523. The collectors 518 and 519 are also cross-coupled to bases 510 and 509 respectively by way of biasing resistors 524 and 525 respectively. The collectors 518 and 519 are also coupled to a pair of input conductors 526 and 527 of the section 502-2.

It will be appreciated that, since the section 502-1 is a bi-stable flip-flop device, one transistor 507 or 508 is conducting while the other transistor nonconducting. When a transistor is conducting, a substantially zero potential appears at its collector. When a transistor is in the nonconducting state, a substantially 15 volt negative potential appears at its collector. Any positive potential applied to the input to the base of a conducting transistor will cause the transistor to cut off and cause the other nonconducting transistor to conduct.

The circuits have been arbitrarily arranged for conduction by the lower transistor 508 and nonconduction by the upper transistor 507 when the section 502-1 is storing a "0." Transistor 508 will be nonconducting and the transistor 507 conducting when a "1" is being stored by the section 502-1. Also, the section 502-1 is considered in its normal reset position when marked with a "0." The section 502-1 will be marked with a "1" only when a bit of a binary address code so marks the section.

It is assumed that the section 502-1 receives the first position digit of each address code. The information input conductor 505 is therefore connected to the lower electrode of the neon tube 310-1 (FIG. 4) by way of wiper 340-2, contact 342-2, and conductor 341-2. The potential at the lower electrode relative to ground is applied to said conductor 505.

In the event that the neon tube 310-1 is nonconducting, ground potential will appear at its lower electrode and, therefore, at the conductor 505. This will have no effect whatsoever upon the circuit of section 502-1.

However, in the event that the neon tube 310-1 is conducting, a 15 volt drop will occur across the resistance 311-1 and a positive 15 volt potential with respect to ground will be impressed upon the conductor 505. This positive potential will cause the transistor 508, which is conducting, to cut off. At the same time, the transistor 507 will be caused to conduct. Hence, the section 502-1 will be storing a "1."

The erasure of this "1" from the section 502-1 subsequent to the transfer of the "1" to the next section 502-2 will be described in greater detail later. However, briefly, the "1" is erased by applying a negative 15 volt potential to the reset pulse input conductor 506. The conducting and nonconducting states of the transistors are not affected until the trailing edge of the reset pulse arrives. The differentiating circuit comprising capacitor 511 and resistance 512 will cause a sharp highly peaked positive pulse at the trailing edge of the negative reset pulse, which positive pulse will cause the transistor 507 to cut off. At the same time the transistor 508 will be caused to conduct.

It will be recalled that the collectors 518 and 519 of the transistors 507, 508 are connected to the input conductors 526 and 527 of the section 502-2 of shift register stage 501-2. Hence, whenever a "0" is stored in the section 502-1, a negative 15 volt potential is felt at conductor 526 and a "0" potential is felt at conductor 527. Alternatively, when a "1" is stored in the section 502-1, a "0" potential is felt at the conductor 526 and a negative 15 volt potential is felt at the conductor 527.

The section 502-2 includes a pair of transistors 530 and 531 which are connected in a manner similar to that in which transistors 507 and 508 are connected to form a bistable flip-flop circuit. Hence, a pair of emitters 532 and 533 are grounded. Collectors 534 and 535 are connected to the inputs 536 and 537 to the next stage and are connected to the negative 20 volt potential by way of load resistors 538 and 539 and conductors 522 and 523. Bases 540 and 541 are cross coupled to the collectors 535 and 534 respectively by way of biasing resistors 542 and 543 respectively.

A pair of base biasing resistors 544 and 545 are connected between their respective transistor bases and a positive 10 volt supply potential. A pair of current limiting resistors 546 and 547 are provided for the transistor bases.

The input conductors 526 and 527 are connected to the current limiting resistors 546 and 547 respectively by way of AND circuits 550 and 551. The AND circuit 550 comprises the conductor 526 and a series connected diode 552, a zone pulse conductor 553 and a series connected diode 554, a resistor 555, a capacitor 556, and a blocking diode 557. In the event that a negative 15 volt potential appears at input conductor 526 and also at the zone pulse conductor 553, a negative 15 volt potential appears at the junction 558. This will cause the capacitor 556 to charge itself by way of diode 557. In the event that the negative 15 volt potential is then removed from one of the conductors 526 or 553, the capacitor 556 will discharge through the transistor 530 to cause the transistor to cutoff if it is conducting.

The AND circuit 551 is similar to the circuit 550. It includes the input conductor 527, diodes 560, 561 and 562, capacitor 563, resistance 564, and the zone pulse conductor 553. In the event that a negative 15 volt potential is applied to the input conductor 526 and to the zone pulse conductor 553, a negative 15 volt potential will appear at the junction 565 to charge the capacitor 563. When subsequently the negative 15 volt potential is removed from one of the conductors 527 or 553, the capacitor 563 is discharged into the base circuit of the transistor 531 to turn the transistor off if it is conducting.

It will be appreciated that only one of the input conductors 526 or 527 will have a negative 15 volt potential applied thereto. In the event that a section 502-1 is storing a "0," its transistor 507 will be nonconducting and the negative 15 volt potential will appear at conductor 526. In the event that the section 502-1 is storing a "1," its transistor 508 will be nonconducting and a negative 15 volt potential will be applied at the input conductor 527.

As will be described in greater detail below, a negative 15 volt potential will be applied to the zone pulse conductor 553 to transfer the address codes in the main memory 500 to next succeeding stages each time that the conveyor belt 3 moves three feet. Hence, each zone pulse will advance the code bit in section 502–1 to section 502–2.

If the section 502–2 has the code bit "0" transferred thereto, its transistors 530 and 531 will assume nonconducting conducting states respectively. A negative 15 volt potential will appear at the input conductor 536 to the next succeeding stage. This negative 15 volt potential will also be applied to the conductor 566. Also, since the transistor 531 is conducting, a "0" potential will be applied to the conductors 537 and 567.

Alternatively, in the event that a "1" is shifted into the section 502–2, a negative 15 volt potential will be applied to the conductor 567 and a "0" potential to the conductor 566. One of the conductors 526 or 567 are connected to each of the corresponding inputs to the decoding circuits 600–1A and 600–1B associated therewith. In the event that the address code to be detected by the decoder 600–1A includes a "1" in the digit position stored by the section 502–2, then the circuit 600–1A is connected to the conductor 567. Alternatively, if the digit position includes a "0," the circuit 600–1A is connected to the conductor 566.

*Decoder circuits 600–1A and 600–1B and motor control circuit 601*

FIG. 6 shows the decoder circuits 600–1A and 600–1B and the motor control circuit 601, all of which are associated with the transfer mechanism 16–1 (FIG. 1). It will be assumed for ease of description that the distribution boards 215 and 225 of FIG. 2 respectively determine the address codes to be detected by the circuits 600–1A and 600–1B respectively. Hence, circuit 600–1A will detect the address code 001000 and the circuit 600–1B will detect 001100.

Accordingly, the conductors 602–1 to 602–6 and their series connected diodes 603–1 to 603–6 are connected to the corresponding sections of the shift register stage 501–2 in such a fashion as to detect the presence or absence of the desired digits. As described above with respect to the main memory section 502–2, the conductor 566 is connected to the circuits 600–1A and 600–1B in the event that the corresponding digit is a "0." Assume that the section 502–2 stores the first position digit and that the conductor 602–1 detects the first position digit. Since the address code for the circuit 600–1A is 001000, the conductor 602–1 will be connected to the conductor 566 of the main memory section 502–2. Similarly the conductors 602–2, 602–4, 602–5, and 602–6 will be connected to conductors corresponding to 566 in the second, fourth, fifth and sixth sections of the main memory stage 501–2. The conductor 602–3 will be connected to a conductor corresponding to 567 in the third section of stage 501–2.

The conductor 602–7 of the decoder 600–1A is connected to a predetermined contact in the master timing switch 702. As will be described in greater detail later, the master timing switch 702 applies a negative potential to the conductor 602–7 at each instant in time when a conveyor belt position, with respect to which packages are centered reaches the center of the discharge mechanism 16–1 (FIG. 1). The purpose of this arrangement is to initiate the operation of the transfer mechanism only after the package center and the mechanism center are aligned, thereby to accurately synchronize the operation of the transfer mechanism with the movement of packages it is to remove from the conveyor belt 3.

Thus it can be seen that the decoder 600–1A is a seven-input AND circuit in which six inputs determine the presence or absence of the assigned address code and the seventh input synchronizes the operation of the associated transfer mechanism with the moving packages. When a negative potential appears at all seven inputs to the decoder 600–1A, a negative potential appears at the junction 605. This negative potential will cause a transistor 606 to conduct, thereby to operate a relay 607. The relay 607 closes contacts 608 which energize a motor start solenoid 609 of the motor control circuit 601. The solenoid 609 will operate contacts (not shown) to operate a reversible three-phase motor to rotate the transfer mechanism 16–1 (FIG. 1) toward the gravity conveyor 17–1A. The solenoid 609 also closes contacts 610 which hold the solenoid 609 operated when the contacts 608 subsequently open. The contacts 608 are closed only momentarily inasmuch as the pulse applied to the conductor 602–7 is of short time duration as will be described later. Consequently, the AND circuit will cause only momentary operation of the transistor 606 and the relay 607.

After the transfer mechanism 16–1 has made on cycle of operation to discharge a package, a limit switch 611 is operated by the transfer mechanism 16–1 to open contacts 612. The solenoid 609 restores to deenergize the motor. The motor circuit 601 also includes a second solenoid 613 which operates contacts (not shown) to energize the motor of the transfer mechanism 16–1 in a direction opposite that controlled by the solenoid 609. The solenoid 613 is controlled by the decoder circuit 600–1B in a manner similar to the control of the solenoid 609 by the decoder 600–1A. The solenoids 609 and 613 are mechanically interlocked to prevent the operation of one while the other is energized.

The decoder circuit 600–1B is similar to decoder 600–1A. Therefore, it has six information input conductors 620–1 to 620–6 and one synchronizing input conductor 620–7. The decoder 600–1B also includes diodes 621–1 to 621–7 which act as inputs of an AND circuit. It has been assumed that the address code 001100 of the distribution card 225 is the code which is assigned to the decoder 600–1B of the discharge station 11. Hence, when said assigned code is stored in the main memory stage 501–2 and when subsequently a synchronizing pulse is applied to the conductor 620–7, a negative potential will be applied to the junction 622 to cause a transistor 623 to conduct. A relay 624 is energized upon conduction by the transistor 623. Relay 624 operates contacts 625 to complete an obvious circuit for operating the motor start solenoid 613. The solenoid 613 causes the conveyor transfer mechanism 16–1 (FIG. 1) to operate in a direction opposite to that in which it was operated by the solenoid 609. When the mechanism 16–1 completes a cycle to discharge a package on the gravity conveyor 17–1B, the limit switch 611 will open contacts 612 to restore the solenoid 613 and stop the transfer mechanism motor.

*Timing and synchronizing circuits*

The timing and synchronizing of the various operations of the present system are shown in FIGS. 7 and 8. FIG. 7 discloses an electromagnetic clock pulse generator 700, a clock pulse amplifier circuit 701, a master timing stepping switch 702 operated by the generator and amplifier, the photosensitive device 15 for detecting packages 7 on the belt 3, and a package stretching and counting circuit 795.

The photosensitive device 15 (FIG. 7) may be any one of a number of commercially available devices including appropriate amplifiers. Each time that a package interrupts the light path between the lamp 14 (FIG. 1) and the photosensitive device 15, an amplified output pulse will be applied to the conductors 740 and 741 (FIG. 7). This pulse will energize a relay 742. The pulse may have positive and negative half cycles; and, therefore, a diode 743 is connected across the relay 742 to short circuit one of the half cycles. When the relay 742 is operated, it closes contacts 746 to prepare a circuit for energizing the magnets, such as M350 of the readout selector switches. A capacitor 744 is also connected across the relay 742 to store energy for maintaining the relay energized for a longer period of time. This provision is desirable in the event that some of the packages 7 are very short.

The photosensitive device must detect a package at the same time that the master timing switch 702 reaches a predetermined position in order to advance the readout selector switches of the buffer memory units 300-1 and 300-2 to their next succeeding positions. Unless the capacitor 744 is provided, it is possible that the photosensitive device 15 might sense a short inaccurately positioned package to cause the relay 742 to energize and deenergize before the switch 702 reached its predetermined position. In such an event, the respective buffer memory readout switch will not be advanced and synchronization between succeeding packages and their respective address codes will be lost. To avoid this situation, the capacitor 744 is made sufficiently large to maintain the relay 742 energized for a sufficient period of time to assure the operation of the readout switches.

A solenoid 745, which operates any one of the number of well known counting devices, is provided to count the number of packages detected by the unit 15.

The electromagnetic generator 700 may be any one of a number well known in the art for producing an output pulse in its coil 710 for each revolution of its magnetic structure 711. The structure 711 in mechanically connected in any well known manner to the means for moving the belt 3 of the conveyor 1. The structure 711 completes thirteen revolutions during movement of the belt 3 a predetermined distance, for example three feet. It will be recalled that the minimum distance between packages in any system will be dependent upon the minimum time which a transfer mechanism, such as 16-1 (FIG. 1), requires to remove a package and be prepared to remove a next succeeding package. The function of the clock pulse generator 700 is to provide precise timing for the various control apparatus functions. Thus, the timing between the package movement and the control circuits can be held to within at least 36/13 inches. It will be apparent that the timing can be made even more precise if desired; but this has not been necessary in actual installations with existing belt speeds.

This three foot distance is also utilized to divide the conveyor path into a plurality of fixed zones for assuring the operation of the transfer mechanisms only when packages are properly aligned therewith. We will see in detail later that each lamp bank 12-1 to 12-4, determines the instant in time at which a package centering position of the belt passes the forward edge of the respective bank. This forward edge is arbitrarily made the forward edge of a zone. Each bank is three feet long and, therefore, defines a zone. Succeeding three foot zones are marked off accordingly.

It will also be seen that the each bank 12-1 to 12-4 is in turn controlled by the master timing switch 702. Therefore, the entry of a package centering position on the belt into and through a zone has a definite relationship with the movement of the switch wipers to succeeding positions.

The position of the center of each transfer mechanism relative to the forward edge of the zone in which it is located must be determined so that its respective decoder can be synchronized to actuate the mechanism when a package center coincides with the transfer mechanism center. Then the position, in which the switch wipers are located when each package centering position of the belt reaches this transfer mechanism zone position, is utilized for timing the operation of the respective decoder.

The output of the electromagnetic generator 700 is fed to the clock pulse amplifying and shaping circuit 701. The voltage produced by the generator will have both a positive and a negative half cycle. The diode 712 shunts the positive half cycle of the induced voltage allowing only the negative half cycle to remain. This negative half cycle is applied to the base of a transistor 713 by way of a current limiting resistor 714 and a base bias resistor 715. The negative pulse causes the transistor 713 to conduct.

The transistor 713 and a second transistor 716 form a monostable multivibrator which produces one output pulse for each negative input pulse. The negative pulse on the base of the transistor 713 causes the circuit to flip, that is, it causes the transistor 713 to start conducting and transistor 716 to cease conducting. The circuit remains in this condition for a duration of time depending upon the values of the coupling capacitor 717 and the base connected resistances 718 and 719. The output pulse taken from the collector 720 of the transistor 716 is a negative pulse which is applied to the base of a transistor 721. As is well known, this negative output is produced by virtue of the fact that the collector of the transistor, when nonconducting, is somewhat below the negative potential (minus 20 volts) to which it is connected; whereas the collector voltage is substantially at ground potential while the transistor conducts.

The negative output pulse from the transistor 716 is inverted to a positive pulse by the transistor 721. A succeeding transistor 722 reinverts the pulse back to a negative pulse. This negative pulse is applied to a power transistor 723 which momentarily energizes the magnet M724 of the master timing switch 701 over an obvious circuit.

Each time that the magnet M724 deenergizes subsequent to its energization by the power transistor 723, it advances the wipers 725-1 to 725-6 of the switch 702 one step to the next succeeding contacts accessible thereto. Thus, it will be appreciated that as the conveyor belt 3 moves a distance of three feet, the clock pulse generator 700 will produce 13 output pulses to cause the magnet M724 to advance the wipers 725-1 to 725-6 thirteen steps.

Certain of the control functions of the control apparatus 2 are performed once for each three foot movement of the belt. Certain other timing functions of the control apparatus 2 are performed only once for each six foot movement of the belt 3. Accordingly, each contact bank accessible to the wipers 725-1 to 725-6 is provided with 26 contact positions. When a contact bank is utilized to control a function which occurs once with each three foot movement of the belt 3, the corresponding contacts in the first and last half of the bank are multiplied.

The first level 730 of the switch 702 is utilized to control three functions of the control apparatus 2. The first and fourteenth contacts 731 and 732 are multipled and are utilized for resetting the neon tubes in the buffer memory units 300-1 and 300-2. The thirteenth and twenty-sixth contacts 737 and 754 are utilized to initiate a zone pulse for advancing address codes in the main memory 500. The seventh and twentieth contacts 736 and 760 are utilized to initiate a pulse for resetting the input stage 501-1 of the main memory.

The resetting of the neon tubes 310-1 to 310-6 will now be described. When the wiper 725-1 is in engagement with contact 731 or 732 a circuit is prepared for energizing the erase relay 840 (FIG. 8). The next energization of the magnet M724 (FIG. 7) closes contacts 755 to energize the relay 840 over the circuit extending from a negative source of potential, through contacts 755, conductor 756, wiper 725-1, contact 736 or 760, conductor 842, and the relay 840 (FIG. 8) to ground.

The relay 840 closes contacts 841 to extend ground potential to the upper electrodes of the neon tubes 310-1 to 310-6 by way of resistance 843, contacts 841, conductor 844, wiper 340-1 (FIG. 3), contact 342-1 (assuming that the wiper has been advanced previously to contact 342-1 to transfer its address code to the main memory unit 500), conductor 341-1, and diodes 312-1 to 312–6. This ground potential will extinguish any ignited neon tube.

The zone pulse amplifier 800 (FIGS. 1 and 8) will now be described in detail. One zone pulse is generated for each thirteenth (13) output pulses of the clock pulse generator 700 and, therefore, for each 3-foot movement of the belt 3. Thus, each time that the magnet M724 (FIG. 7) is energized by a pulse from the generator 700 and amplifier 701, while the wiper 725–1 is in engagement with either contact 737 or 754, a circuit will be completed for generating a zone pulse. This circuit extends from a negative 24 volt supply potential through contacts 755 which are closed upon energization of the magnet M724, conductor 756, wiper 725–1, contact 737 or 754, contacts 796, and conductor 757 to the zone pulse amplifier 800 (FIG. 8). The contacts 796 close only momentarily incident to the energization of the magnet M724.

The zone pulse amplifier 800 includes an input load resistor 806 across which the above mentioned negative 24 volt potential in applied by way of the master timing switch 702. The zone pulse amplifier 800 also includes a pair of transistors 807 and 808 with associated circuit connections providing a one-shot multivibrator similar to the multivibrator described above in the clock pulse amplifier 701. The circuit is arranged such that the transistor 808 is normally conducting and the transistor 807 normally nonconducting.

The negative pulse applied to the input resistor 806 causes the transistor 807 to conduct and the transistor 808 to cease conducting. After a predetermined time interval, the transistor 808 will again conduct and the transistor 807 cease to conduct. During the time interval that transistor 808 is nonconducting, a negative potential appears at its collector 809. This negative potential is applied to a transistor circuit 810 which inverts the pulse to cause a positive pulse to be applied to the collector 811. The positive pulse appearing at the collector 811 is applied to the base 812 of a normally conducting power transistor 813 by way of a current limiting resistor 814. Hence, the power transistor 813 will cease to conduct for a short time interval determined by the length of the pulse applied thereto, thereby to produce a shaped and amplified negative output pulse at its collector 815.

The collector 815 is connected by way of a conductor 816 to the input conductors such as 553 (FIG. 5) to the AND circuits, such as 550 and 551 (FIG. 5), in all sections of all of the main memory stages 501–2 to 501–n inclusive. It will be recalled that this zone pulse causes the transfer of address codes from stage to stage in the main memory 500 in synchronism with the movement of the packages 7, to which the address codes have been respectively assigned, into discharge stations, such as 11–1, corresponding to the respective main memory stages.

The reset pulse amplifier 819 is shown diagrammatically in FIGS. 1 and 8. The amplifier 819 may be identical to the input and one shot multivibrator portions of the zone pulse amplifier 800; and, therefore, need not be described in detail. Briefly, it will produce a shaped and amplified negative output pulse at the conductor 817 incident to receiving a negative input pulse at conductor 818. However, since the inverter and power transistor of the zone pulse amplifier are not included in the reset pulse amplifier, the output pulse will have less power.

The circuit for producing the input negative pulse at the conductor 818 (shown in FIG. 7) is similar to that producing the input pulse for the zone pulse amplifier 800. This circuit is completed by energization of the magnet M724 when the wiper 725–1 is in engagement with conatct 736 or contact 760. This circuit extends from the negative 24 volt potential through the contacts 755, conductor 756, wiper 725–1, contact 736 or 760, and contacts 797 to conductor 818. The contacts 797 are momentarily closed by the energization of the magnet 724.

The negative output pulse produced at conductor 817 (FIG. 8) by the reset pulse amplifier 819 is applied to the reset pulse input conductor, such as 506 (FIG. 5), of each section, such as 502–1, of the first main memory stage 501–1. As described above, the function of the reset pulse is to reset each secton, such as 502–1, to a condition in which it is marked with a "0" subsequent to its being marked with a "1," which "1" has been transferred to the succeeding main memory stage 501–2.

The circuits for advancing the read-out selector switches, such as 302, of the buffer memory units will now be described. It will be recalled that the photosensitive device 15 (FIG. 7) operates relay 740 each time it senses a package. The relay in turn closes contacts 746 to prepare a circuit for energizing the magnet, such as M350 (FIG. 4) of one of the read-out switches. When the wiper 725–2 subsequently engages its second or fifteenth position contacts 735 or 738, with the contacts 746 still closed, the circuit is further prepared.

With the wiper 725–2 so positioned and with the contacts 746 so closed, the subsequent energization of the magnet M724 by the next clock pulse will complete a circuit for operating a respective one of the readout selector switch magnets. Thus, a circuit will be completed from a positive 24 volt potential, thorugh closed contacts 747 of the magnet M724, conductor 748, contacts 746, conductor 749, normally closed contacts 750, wiper 725–2, contact 735 or 738, conductor 751 or 752, normally closed contacts 801 or 802 (FIG. 8), and conductor 803 or 804, to the magnet M350 or to its corresponding magnet in the buffer memory unit 300–2. The read-out selector switch of the energized magnet advances its wipers one step when the magnet deenergizes subsequent to the deenergization of magnet M724 at the end of the clock pulse. Also, when the magnet M724 deenergizes, the wipers 725–1 to 725–6 advance one step.

When the wipers of a buffer memory unit are advanced as described above, they connect the next storage section to the main memory input stage 501–1. This next storage section has marked therein the address code of the package just detected by the photosensitive device 15.

Provision has been made to permit the operation of the system with only keyboard 200–1 and buffer memory unit 300–1 in use. In such an event, the readout selector switch 302 (FIG. 4) must be advanced one step each time a package passes the photosensitive device 15 rather than upon the passage of alternate packages. To permit this operation, a manually operable switch 260 (FIG. 2) is provided at the keyboard 200–1. Actuation of the switch 260 extends a negative 24 volt potential through contacts 261 and conductor 262 to operate a relay 765 (Fig. 7). The relay 765 opens contacts 750 and closes contacts 766 to connect the conductor 749 to the wiper 725–3 instead of to wiper 725–2. The second and fifteenth contacts 767 and 768 are both connected to the conductor 751 which, as described above, is connected to the readout selector magnet M350 (FIG. 4). Hence, the magnet M350 will be operated each time that the photosensitive device 15 detects a passing package 7 while the wiper 725–3 engages contact 767 or 768.

It will be recalled that at all times one storage section such as 303–1 of each buffer memory unit 300–1 and 300–2 is connected by way of its respective read-out selector switch to the main memory input stage 501–1. The two sections are therefore connected in parallel. It will be appreciated that, during normal operation of the present conveyor system, packages will be placed at every three feet on the belt 3 and that both buffer memory units will be partially filled with a plurality of address codes.

Provision must therefore be made to assure the transfer of correct address codes at proper intervals from the main memory stage 501–1 to stage 501–2. This is accomplished by the unique timing sequence of the various functions controlled by the switch 702. An analysis of the two upper levels of the switch 702 with respect to the main memory reset, zone pulse transfer, buffer memory reset, and buffer memory advance functions will now be made to clarify this sequence.

It has been seen that the magnet M350 is operated to advance its associated wipers only once for each complete twenty-six step cycle of the switch 702. That is, the magnet M350 is operated only when the wiper 725-2 engages its second position contact 735. Therefore, each storage section such as 303-1 of the buffer memory 300-1 is connected to the main memory input stage 501-1 while the wiper 725-2 advances from the second position contact 735 through twenty-six steps back to contact 735. Similarly each storage section of buffer memory unit 300-2 is connected to the input stage 501-1 while wiper 725-2 advances from the fifteenth position contact 738 through a complete cycle back to contact 738.

Assume that the system has just been put into operation and that no information is stored in either of the buffer memory units 300-1 or 300-2. Now assume that three packages are placed on the belt 3 and the address codes of the first and third package are read into the buffer memory 300-1 and the address code of the second package into buffer memory 300-2. Shortly thereafter, the photosensitive device will detect the first package. As soon as the wiper 725-2 reaches the second contact 735 and magnet M724 energizes, the readout selector switch 302 will be operated to advance the wipers 340-1 to 340-7 to a contact position in which the storage section, having the first package address code, will be connected to the input stage 501-1 of the main memory 500.

A similar storage section, having no address code, of the other buffer memory unit is also connected to the input stage 501-1. Therefore, each of the six neon tubes in one storage section will have its lower electrode connected in parallel with a corresponding neon tube in the other storage section. When two paralleled neon tubes are both nonconducting, both will extend ground potential to the main memory stage 501-1. When one of the two parallel neon tubes is conducting, the positive voltage extended to the stage 501-1 will merely be lowered in view of the fact that the lower electrode is connected to ground by way of the two resistances connected to the parallel tubes rather than one resistance. This lowered positive voltage will, however, be sufficient to control the input stage transistors as described above.

The wipers 725-1 to 725-6 are advanced until the wiper 725-1 engages the seventh position contact. A reset pulse is applied to the input stage 501-1. This is of no effect, however, since the storage section with the first package address code is still connected to the stage.

The wipers 725-1 to 725-6 continue to advance until the wiper 725-13 engages the thirteenth position contact 737. A zone pulse transfers the first package address code to the second main memory stage 501-2. The address code also remains in the input stage 501-1.

When the next clock pulse advances the wipers, wiper 725-1 engages its fourteenth position contact; and the first package address code is erased from the buffer memory unit 300-1. When the next clock pulse advances the wipers, the wiper 725-2 engages its fifteenth position contact 738; and the storage section of the buffer memory 300-2 having the second package address code is connected to the input stage 501-1.

Since the first package address code is still held by stage 501-1, each "1" of both the first and second package address codes is marked in the stage. However, as the wipers 725-1 to 725-6 continue to advance, the wiper 725-1 will soon engage the twentieth position contact 760 and a reset pulse will be applied to the stage 501-1. Each "1" of the first package address code will be erased from the stage, except of course the second package address code included a "1" in the same digit position. Thus, only the second package code will remain in the stage.

An erroneous address code in the stage 501-1 during the interval that the wipers 725-1 to 725-6 advance from their fifteenth to their twentieth contact positions is of no consequence. The only critical time for the existence of a correct address code is the time at which a zone pulse causes the transfer of the code from stage 501-1 to the stage 501-2. This occurs when the wipers 725-1 to 725-6 subsequently reach their twenty-sixth contact positions. One contact position later, storage section of the buffer memory 300-2, holding the second package address code, is reset. In the seventh contact positions of the wipers 725-1 to 725-6, the second package address code is erased from the main memory stage 501-1.

The timing of the decoders 600-1A to 600-39B will now be described. It will be recalled that each of the decoders 600-1A to 600-39B inclusive periodically examines its corresponding main memory stage for the address code assigned to the decoder. It will also be recalled that this examination takes place upon the application of a synchronizing pulse to the synchronizing input conductor, such as 602-7 (FIG. 6), of the respective decoder.

The decoders may be operated incident to any one of the output pulses of the clock pulse generator 700 except the pulse succeeding that which produces a zone pulse. During the time interval after the zone pulse, the main memory circuits are stabilizing incident to the transfer of address codes to succeeding stages. The address codes cannot be examined at this time. The fourth level 770 (FIG. 7) of the master timing switch 702 is utilized to produce decoder synchronizing pulses. It will be recalled that the zone pulses are produced when the wipers of the switch 702 are in engagement with their thirteenth and twenty-sixth accessible contacts. Hence, any contact in the level 770, except the first and fourteenth, may be utilized to initiate the operation of the decoders. The wiper 725-4 of the level 770 is normally connected to a negative 24 volt source of potential by way of conductor 772, break contact 773 of the magnet M724, and conductor 774.

It is assumed for purposes of description that the transfer mechanism 16-1 is positioned with respect to the arbitrary conveyor path zones such that the starting of its motor should begin when the wiper 725-4 is in engagement with its second or fifteenth accessible contacts 775 or 776. Hence, the contacts 775 and 776 are both connected to the synchronizing input conductors 602-7 and 620-7 (FIG. 6) of the decoders 600-1A and 600-1B by way of a conductor 777. Therefore, whenever the magnet M724 restores to close contacts 773 and to simultaneously advance the wiper 725-4 into engagement with contact 775 or 776, a negative synchronizing pulse will be applied to the inputs of the decoders 600-1A and 600-1B so that they may examine their corresponding main memory stage 501-2 for the assigned address code. It will be appreciated that conductor 777 may also be connected to any one or more of the other decoders in the control apparatus 2 in the event that their corresponding transfer mechanisms are positioned similar to mechanism 16-1 relative to the zone in which they are located.

The lamp banks 12-1 to 12-12 (FIGS. 1 and 8) will now be described in detail. As indicated above, the loading area 8 is provided with four banks of lamps 12-1 to 12-4 each of which is three feet in length. The marking areas 9 and 10 are provided with banks of lamps 12-5 to 12-8 and 12-9 to 12-12. Each of the banks 12-1 to 12-12 includes 13 lamps corresponding to the 13 clock pulses produced with each three foot movement of the belt 3.

In the loading area banks 12-1 to 12-4, succeeding lamps in each bank will be successively energized by successive clock pulses. Lamps in corresponding positions in each of the banks 12–1 to 12–4 will be simultaneously energized. Hence, all first position lamps in banks 12–1 to 12–4 will be energized, then second position lamps, etc.

Lighting of the lamps in banks 12–1 to 12–4 (FIG. 8) is provided by the bank 780 (FIG. 7) of the master timing switch 702. The contacts in level 780 are accessible to the wiper 725–5. It will be noted that the first thirteen contacts in the level 780 are respectively multipled with the last thirteen contacts in the level. The thirteen multipled output conductors 781–1 to 781–13 inclusive are connected respectively to lamps 820–1 to 820–13 (FIG. 8) of bank 12–1 by way of the cable 782.

Thus, as the wiper 725–5 sequentially engages the contacts 783–1 to 783–13, the lamps 820–1 to 820–13 will be energized in sequence. Also, as the wiper 725–5 engages contact 783–14 to 783–26, the lamps 820–1 to 820–13 will again be energized in sequence. Consequently, the lamps 821–1 to 821–13 are sequentially energized for each three foot movement of the conveyor belt 3. At any instant in time, the energized lamp in the bank 12–1 indicates the belt position at which a package is to be centered.

It will be noted in FIG. 8 that corresponding lamps in banks 12–1 to 12–4 inclusive are parallel. Thus lamps 820–1, 821–1, 822–1 and 823–1 are connected in parallel and are energized simultaneously. Similarly, lamps 820–13, 821–13, 822–13 and 823–13 are connected in parallel and are energized simultaneously. Similarly, the other lamps (not shown) in banks 12–2, 12–3 and 12–4 are connected in parallel with the respective lamps 820–2 to 820–12 and are energized correspondingly. Hence, the operator at the loading area 8 will be advised of the centering positions for four packages at all times.

This means for completing the circuit for energizing the various lamps in the banks 12–1 to 12–4 is the relay 785 (FIG. 7) which is energized in response to each energization of the magnet M724. The circuit for energizing the relay 785 extends from positive 24 volt potential, through contacts 747, conductor 786, and the relay 785 to ground. When the relay 785 energizes, it closes contacts 787 to complete a circuit from a 110 A.C. source of potential (FIG. 2) through lamp 263, conductor 264, a variable resistance 788 (FIG. 7), contacts 787, wiper 725–5, contacts 783–1 to 783–26, conductors 781–1 to 781–13, and the lamps in the banks 12–1 to 12–4 to ground.

The variable resistance 788 may be adjusted to provide the desired amount of light intensity produced by the lamps. The relay 785 has a very low operate and release time. Hence the lamps are energized only for very short intervals between the operation of the magnet M724 and its release. It is preferable that the lamps are not conducting when the wipers of the switch 701 are advanced from one contact to the next. Otherwise contact life will be seriously lowered by arcing due to breaking the circuit under load. Hence, the short release time of relay 785 and the short closure time of contacts 747 of the magnet M724 assure breaking of the lamp circuit at relay contact 787 prior to advancement of the wipers 725–1 to 725–6.

In each of the marking areas 9 and 10, only alternate banks are energized simultaneously so that each operator will read and mark into the respective keyboard 200–1 or 200–2 the geographic codes of packages located on alternate package centering positions. For example, the operator in area 9 will handle packages located on centering positions 1, 3, 5, etc., and the operator in area 10 will handle packages on positions 2, 4, 6, etc.

The lamp banks 12–5 to 12–12 of the marking areas 9 and 10 (FIGS. 1 and 8) are energized as described above to mark alternate packages for handling by the operators in the areas 9 and 10. Consequently, the first half of level 790 (FIG. 7) of the master timing switch 701 is connected by way of its contacts and cable 791 to banks 12–6, 12–8, 12–9 and 12–11 (FIG. 8). The second half of the level 790 is connected by way of its contacts and cable 792 to banks 12–5, 12–7, 12–10 and 12–12.

The circuit for energizing the lamps in the banks 12–5 to 12–12 inclusive is similar to that which energizes the banks 12–1 to 12–4. More specifically the wiper 725–6 of level 790 is connected with the wiper 725–5, which latter wiper controls the sequential operation of the lamps in the banks 12–1 to 12–4. Hence, the wiper 725–6 will selectively control the operation of the lamps in banks 12–5 to 12–12.

More particularly, the first thirteen contacts 793–1 to 793–13 (FIG. 7) of the level 790 are connected to conductors 794–1 to 794–13 of the cable 791. These conductors 794–1 to 794–13 are connected repectively to lamps 831–1 to 831–13 of bank 12–6, lamps 833–1 to 833–13 of bank 12–8, lamps 834–1 to 834–13 of bank 12–9, and lamps 836–1 to 836–13 of bank 12–11. Hence as the wiper 725–6 engages the contacts 793–1 to 793–13, the lamps in banks 12–6, 12–8, 12–9 and 12–11 will be sequentially energized.

In a similar manner, the lamps in banks 12–5, 12–7, 12–10 and 12–12 will be sequentially energized by way of conductors 794–14 to 794–26 as the wiper 725–6 engages contacts 793–14 to 793–26.

It will be appreciated that the operation of the lamp banks 12–5 to 12–12 must be synchronized properly with the advancement of the buffer memory readout selector switches by the photosensitive device 15 (FIG. 1). Hence, the photosensitive device 15 must detect a package marked by the operator in the area 9 while the second position lamps in the banks 12–6, 12–8, 12–9 and 12–11 are energized. Similarly, the photosensitive device 15 will detect a package handled by the operator in area 10 when the second position lamps in the banks 12–5, 12–7, 12–10 and 12–12 are energized.

Therefore, the photosensitive device 15 may be placed in a position approximately six feet, or a multiple thereof, from the second position lamp in the bank 12–12. However, it will be recalled that, in order to avoid an error when detecting a very small package, it is preferable to have the photosensitive device slightly in advance of the theoretically exact time when a package should be detected, that is, at least when the package centering position of the belt passes the photosensitive device 15. It will also be recalled that the device 15 must also be placed adjacent the forward edge of the zone in which the first discharge station 11–1 is located.

*Routing of a package 7 to the gravity conveyor 17–1A*

It will be assumed that the package 7 will be handled by the operator in the marking area 9, that the address code 001000 of the distribution board 215 is the address code corresponding to the conveyor 17–1A, that the geographical area of the package is 49, that the decoder 600–1A corresponds to the gravity conveyor 17–1A, that the sections 502–1 and 502–2 of the main memory unit 500 received store and advance the first position digit "0" of the address code, that the buffer memory read-in and read-out switches 301 and 302 are in the positions shown, that both keyboards and buffer memory units are in use whereby contacts 750 of relay 765 are closed, and that the switch contacts 801 and 802 are in their shown closed positions.

Figure 2:
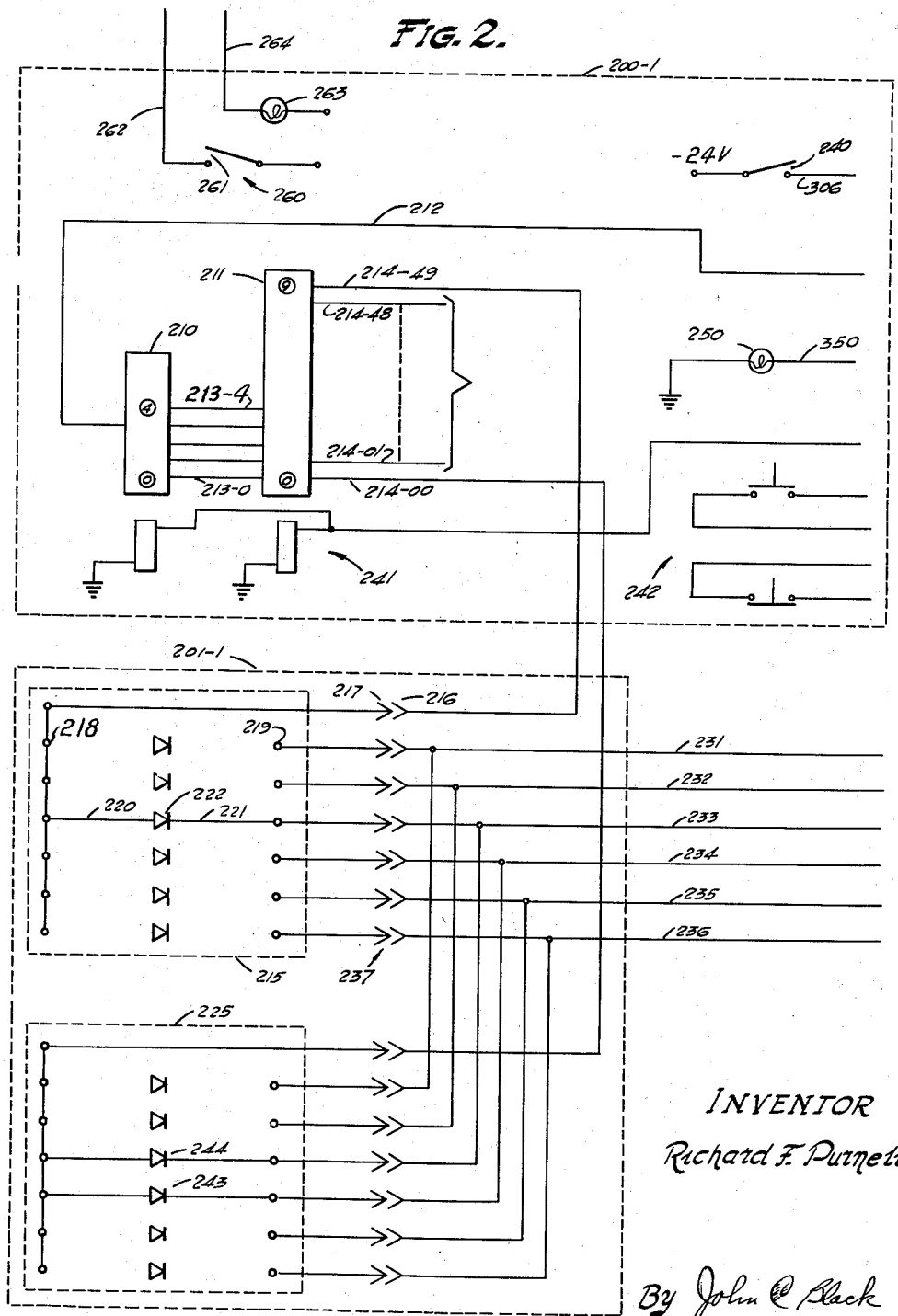
FIG. 2 shows a keyboard circuit and a code distribution plug circuit.

An operator in the loading area 8 (FIG. 1) will place the package 7 on the belt 3, positioned on a package centering belt position identified by one of the lighted lamps in the banks 12–1 to 12–4. When the package 7 arrives at the marking area 9, a second operator will read the address and will actuate the tens key 4 and the units key 9 of the keyboard 200–1 (FIG. 2). The second operator will then depress the enter bar switch 240 to energize the buffer memory start relay 305 (FIG. 3). The relay 305 will operate contacts 308 to energize the magnet M309 of the read-in selector switch 301. The relay 305 will also close contacts 307 to extend a positive 150 volt potential through the circuit established by the tens key 4 and the units key 9 of the keyboard 200–1 and by the distribution board 215 to write the address code 001000 into the neon tubes 310–1 to 310–6 of the storage unit 303–1.

The magnet M309 closes contacts 321 to complete a circuit for energizing the release coils 241 to restore the tens key 4 and the units key 9 of the keyboard 200–1. Subsequently, the magnet M309 restores to advance the wipers 304–1 to 304–7 to the next accessible contacts in preparation for the entry of the address code of another package.

Meanwhile, the master timing switch 702 (FIG. 7) is being sequentially operated by the clock pulse generator 700 and its amplifier 701 for each three foot movement of the belt 3. Each of the input sections, such as 502–1 (FIG. 5) of the first main memory stage 501–1, will be marked with a "0" and will remain so marked.

As the package 7 approaches the first discharge station 11–1, it will be detected by the photosensitive device 15. The device 15 will cause the relay 742 (FIG. 7) to be operated to close contacts 746. This will prepare a circuit for energizing the readout selector switch magnet M350 (FIG. 4) of the buffer memory unit 300–1. The clock pulse generator 700 and its amplifier 701 will be operating and restoring the magnet M724 of the master timing switch 702 every 36/13" of movement of the belt 3. The wipers 725–1 to 725–6 of the switch 702 will be advanced one step for each release of the magnet M724. The first time that the wiper 725–2 engages its second position contacts 735 after the closure of contacts 746, the circuit for operating the readout selector switch magnet M350 is further prepared. When the next clock pulse energizes the magnet M724, the contacts 747 of the magnet are closed to complete the circuit for energizing the magnet M350.

The magnet M350 will restore incident to the restoration of the magnet M724 at the end of the clock pulse. The wipers 340–1 to 340–8 of the buffer memory unit 300–1 will be advanced to engage the upper first position contacts 342–1 to 342–8. The neon tubes 310–1 to 310–6 are now connected to the input sections, such as 502–1 of the main memory input stage 501–1. The section 502–1 is connected to the lower electrode of the neon tube 310–1. The neon tube 310–1 is nonconducting and, therefore, has ground potential at its lower electrode corresponding to a code bit "0." Since the section 502–1 already stores a "0," it will not be affected by the connection to the tube 310–1. Only the third input section (not shown), which is connected to the conducting neon tube 310–3, will be affected. The negative 15 volt potential at the lower electrode of the tube 310–3 will cause the conducting transistor (corresponding to transistor 508) of the third section in stage 501–1 to cease conducting, thereby to cause the other transistor to conduct.

Thus the address code 001000 will be stored in the six sections of the stage 501–1. The wipers 725–1 to 725–6 will be advanced step by step by succeeding clock pulses until the wipers reach the seventh contact positions. At this time, the wiper 725–1 engages contacts 736 to prepare a circuit for operating the reset pulse amplifier 34. The next energization of the magnet M724 closes the contacts 755 to apply a pulse to the input 818 of the reset pulse amplifier 34. The pulse is amplified and applied to the output 817 of the reset pulse amplifier to reset all of the sections such as 502–1 of the main memory input stage 501–1. This would normally cause the erasure of the code bit "1" from the third section (not shown) of the stage 501–1. However, since the tube 310–3 is still conducting and since its lower electrode is still applied to the input of said third section, the "1" will remain marked in the section.

Succeeding clock pulses will cause the wipers 725–1 to 725–6 to continue to advance until they engage their thirteenth contact positions. In this position, the wipers 725–1 engage the contacts 737. The next succeeding clock pulse causes the energization of the magnet M724 to again close contacts 755, this time to apply a pulse to the input conductor 757 of the zone pulse amplifier 800. The amplifier 800 applies an amplified output pulse to conductor 816 which is applied to the zone pulse input conductors such as 553 of all of the sections of all of the stages 501–2 to 501–N. This will cause the address code 001000 stored in stage 501–1 to be transferred to the stage 501–2.

The wiper 725–1 to 725–6 are then advanced to the fourteenth contact positions. The next energization of magnet M724 closes contacts 755 to energize the buffer memory reset relay 840 (FIG. 8). The relay 840 closes contacts 841 to extend ground potential to the upper electrodes of all of the neon tubes 310–1 to 310–6. This will cause the neon tube 310–3 to cease conducting whereby the storage unit 303–1 is reset. However, the input stage 501–1 still retains the address code 001000. This code will be erased when the wipers reached the twentieth accessible contact in which position the wipers 725–1 engages contacts 760. The next energization of the magnet M724 causes the reset pulse amplifier 34 to erase the code from the stage 501–1.

It has been assumed that the code 001000 has been entered into the stage 501–1 and then transferred to the stage 501–2. It has further been assumed that this particular address code is the code assigned to the decoder 600–1A at transfer mechanism 16–1 and the gravity conveyor 17–1A.

The magnet M724 releases to advance the wipers 725–1 to 725–6 to their fifteenth contact positions. The wiper 725–4 engages the contact 776 to complete a circuit for applying a negative potential to the synchronizing input conductor 777 of the decoders 600–1A and 600–1B (FIG. 6). The conductors 602–1, 602–2, 602–4, 602–5 and 602–6 are connected to the "0" conductors, such as 566, of the first, second, fourth, fifth, and sixth sections of stage 501–2. The input conductor 602–3 is connected to the "1" conductor, such as 567, of the third section of stage 501–2. Since the stage 501–2 is marked with code 001000, negative potentials now appear at all of the input conductors 602–1 to 602–6. Consequently, a negative potential appears at the junction 605 and the relay 607 is energized.

The relay 607 energizes the motor start solenoid 609 and the transfer mechanism 16–1 pushes the package 7 from the belt 3 to the gravity conveyor 17–1A. Workmen transfer the package 7 from the gravity conveyor 17–1A to the nearby car destined for the geographic area represented by the decimal code 49.

While there has been described what is at present believed to be the preferred embodiment of the invention, it will be understood that various modifications may be made therein; and it is contemplated to cover in the appended claims all such modifications as fall within the true spirit and scope of the invention.

What is claimed is:

1. In a conveyor system of the type in which objects at a loading position are placed on a moving conveyor at spaced positions for movement to selected ones of a plurality of discharge stations adjacent a path traversed by the conveyor and in which control circuits synchronized with the movement of the conveyor operate transfer mechanisms to remove the objects at their respective selected discharge stations, the combination with the control circuits of a plurality of spaced visually observable devices positioned along the conveyor at the loading position and operated in the order of their appearance in the direction of conveyor movement to indicate a position on the conveyor with respect to which an object is to be positioned.

2. In a conveyor system of the type in which objects at a loading area are placed on a moving conveyor for movement to selected discharge stations adjacent a path traversed by the conveyor and in which control apparatus automatically removes the objects at their respective discharge stations, the combination with the control apparatus of a plurality of spaced visually observable devices positioned along the conveyor at the loading area and operated in the order of their appearance along the loading area in the direction of conveyor movement to indicate the positions on the moving conveyor with respect to which objects are to be positioned.

3. In a conveyor system of the type in which objects at a loading area are placed on a moving conveyor at equally spaced positions for movement to selected ones of a plurality of discharge stations adjacent a path traversed by the conveyor and in which control circuits synchronized with the movement of the conveyor operate transfer mechanisms to remove the objects at their respective selected discharge stations, the combination with the control circuits of a plurality of spaced visually observable devices positioned along the conveyor at the loading area, and means operated in synchronism with the movement of the conveyor for operating the devices in the order of their appearance along the loading area in the direction of conveyor movement to indicate the positions on the conveyor with respect to which objects are to be positioned.

4. In a conveyor system of the type in which objects at a loading area are placed on an endless moving conveyor belt at spaced positions for movement to selected ones of a plurality of discharge stations adjacent a path traversed by the belt and in which control circuits synchronized with the movement of the belt operate transfer mechanisms to remove the objects at their respective selected discharge stations, the combination with the control circuits of a plurality of spaced visually observable devices positioned along the conveyor at the loading area, and means operated in synchronism with the movement of the belt for operating the devices in the order of their appearance along the loading area in the direction of belt movement to indicate the positions on the moving belt with respect to which objects are to be positioned, whereby stretching of the belt over an extended period of use will not result in inaccurate positioning of the objects.

5. In a conveyor system of the type in which objects at a loading area are placed on an endless moving conveyor belt at equally spaced positions for movement to selected ones of a plurality of discharge stations adjacent a path traversed by the belt and in which control circuits synchronized with the movement of the belt operate transfer mechanisms to remove the objects at their respective selected discharge stations, the combination with the control circuits of a plurality of lamps positioned along the conveyor belt at the loading area, and means including a timing switch operated in synchronism with the movement of the belt for energizing the lamps in the order of their appearance along the loading area in the direction of belt movement to indicate the positions of the moving belt with respect to which objects are to be positioned, whereby stretching of the belt over an extended period of use will not result in inaccurate positioning of the objects.

6. In an automatic conveyor system of the type in which objects are placed on a conveyor for movement to selected discharge stations adjacent the conveyor path and in which a pair of operators in areas along the conveyor write assigned address codes of alternate packages into control apparatus to cause the packages to be selectively removed from the conveyor at their respective discharge stations, the combination with the control apparatus of at least one group of visually observable devices positioned along the conveyor in each area in which an operator is working, each device operated in the order of its appearance in a group in the direction of conveyor movement coincident with the movement of packages which are to be handled by the respective operator past the device.

7. In an automatic conveyor system of the type in which objects are placed on a conveyor for movement to selected discharge stations adjacent the conveyor path and in which a pair of operators in areas along the conveyor write assigned address codes of alternate packages into control apparatus to cause the packages to be selectively removed from the conveyor at their respective discharge stations, the combination with the control apparatus of at least one group of visually observable devices positioned along the conveyor in each area which an operator is working, and circuit means operated in synchronism with the conveyor for operating each device in the order of its appearance in a group in the direction of conveyor movement coincident with the movement of packages which are to be handled by the respective operator past the device.

8. In a conveyor system of the type in which an object intended for delivery to a predetermined ultimate destination is placed on a transporting mechanism for movement to a predetermined one of a plurality of discharge stations adjacent a path traversed by the transporting mechanism, in which control apparatus causes a transfer mechanism to selectively remove the object from the transporting mechanism when it reaches the predetermined discharge station, and in which a manually operable apparatus including a plurality of keys each corresponding to an ultimate object destination causes an address code assigned to the predetermined discharge station to be written into the control apparatus for selectively controlling the transfer mechanism incident to the operation of the key corresponding to the predetermined ultimate destination, the combination with the manually operable apparatus of a plurality of replaceable plug-in circuits each effective for causing a different address code assigned to a different discharge station to be written into the control apparatus incident to the depression of the key corresponding to the predetermined ultimate destination, whereby the discharge station selected for receiving packages intended for the predetermined ultimate destination may be varied at random.

9. In a mail sorting system of the type in which mail and parcel post packages are placed on a conveyor for movement to selected discharge stations adjacent a path traversed by the conveyor, in which control apparatus cause transfer mechanisms at the discharge stations to selectively remove the packages from the conveyor when they reach their selected discharge stations, and in which manually operable apparatus includes a plurality of keys, each corresponding to a common destination point for a different fixed geographic area, to cause address codes, each of which is assigned to a respective discharge station, to be written into the control apparatus for selectively controlling the transfer mechanisms, in combination with the manually operable apparatus a plurality of replaceable plug-in circuits, each effective to form one of the address codes, mating plug-receiving structure for receiving a selected plug-in circuit for each key, and circuit means including the selected plug-in circuits and the mating structure for causing the respective selected address code to be written into the control apparatus incident to the depression of each key, whereby the discharge stations selected for receiving packages intended for each geographic area may be varied at random.

10. In a conveyor control system of the type in which objects are placed on a transporting mechanism, each for movement to a selected one of a plurality of discharge stations adjacent a path traversed by the transporting mechanism, and in which transfer mechanisms selectively remove the objects from the transporting mechanism when they reach their selected discharge stations, the combination with the transporting and transfer mechanisms of control apparatus, comprising a first and second buffer memory units, first and second manually operated keyboards for causing address codes assigned to the selected discharge stations of alternate objects to be written respectively in the first and second buffer memory units, a stationary multi-stage storage device operated in synchronism with the movement of the transporting mechanism and including at least one storage stage corresponding to each discharge station, circuits effective incident to the movement of the objects past a predetermined position along the path for transferring the address codes of succeeding objects from the buffer memory units to the synchronous storage device, circuits for advancing the address codes to succeeding stages of the synchronous storage device coincident with the movement of the respective packages along the transporting mechanism path, address code detectors corresponding to each discharge station and connected with the corresponding synchronous storage device stages for causing the transfer mechanisms to remove the objects from the transporting mechanism at the selected discharge stations.

11. In a conveyor control system of the type in which objects are placed on a transporting mechanism, each for movement to a selected one of a plurality of discharge stations adjacent a path traversed by the transporting mechanism and in which transfer mechanisms selectively remove the objects from the transporting mechanism when they reach their selected discharge stations, the combination with the transporting and transfer mechanisms of control apparatus comprising a first and second groups of temporary storage devices, first and second manually operated keyboards for causing address codes assigned to the selected discharge stations of alternate objects to be written respectively in succeeding ones of the first and second groups of temporary storage devices, a stationary multi-stage storage device operated in synchronism with the movement of the transporting mechanism and including at least one storage stage corresponding to each discharge station, circuits effective incident to the movement of the objects past a predetermined position along the path for transferring the address codes of succeeding objects from the storage devices to the synchronous storage device, circuits for advancing the address codes to succeeding stages of the synchronous storage device coincident with the movement of the respective packages along the transporting mechanism path, address code detectors corresponding to each discharge station and connected with the corresponding synchronous storage device stages for causing the transfer mechanisms to remove the objects from the transporting mechanism at their selected discharge stations.

12. A semiautomatic conveyor system comprising a moving belt for transporting packages from a loading area past a pair of marking areas to selected discharge stations, at least one bank of lamps disposed along the belt in the loading area and energized in their order of appearance for locating a belt position with respect to which packages are centered, lamps in each of the marking areas energized coincident with the movement of alternate package centering positions thereby for advising operators in each marking area which packages they are to handle, a pair of buffer memory units, a keyboard in each marking area manually operated for writing package address codes into a respective one of the buffer memory units, an address code being assigned to each of the discharge stations, a main memory device, circuit means effective when each package passes a predetermined conveyor path position for transferring the package address codes from the buffer memory units to the main memory unit in the order in which the packages appear on the belt, the main memory device operated in synchronism with the movement of the belt for advancing address codes therein coincident with the movement of the respective packages along the belt path, a decoder for examining each address code as it reaches a position in the main memory unit corresponding to a discharge station for the address code assigned to the discharge station, and a transfer mechanism operated by the decoder incident to the detection of the assigned address code for discharging packages at the selected discharge station.

13. A semiautomatic conveyor system comprising a moving belt for transporting packages from a loading area past a pair of marking areas to a plurality of discharge stations, at least one bank of lamps disposed along the belt in the loading area and energized in their order of appearance for locating a belt position with respect to which packages are centered, lamps in each of the marking areas energized coincident with the movement of alternate package centering positions thereby for advising operators in each marking area which packages they are to handle, a pair of buffer memory units, a keyboard in each marking area manually operated for writing package address codes into the respective one of the buffer memory units, an address code being assigned to each of the discharge stations, a multi-stage shift register, circuit means effective when each package passes a predetermined conveyor path position for transferring the package address codes from the buffer memory units to the shift register in the order in which the packages appear on the belt, the shift register operated in synchronism with the movement of the belt for advancing address codes to succeeding stages therein coincident with the movement of respective packages along the belt path, decoders for examining the address codes as they reach stages in the main memory unit corresponding to discharge stations for the address codes assigned to the discharge stations, and transfer mechanisms operated by decoders incident to the detection of the assigned address codes for discharging packages at their selected discharge stations.

14. For use in a semiautomatic conveyor control system, timing apparatus comprising: an electromagnetic pulse generator including a permanent magnet structure and a co-operating coil, one of which is mechanically connected to the conveyor for movement in synchronism therewith; a pulse amplifying and shaping circuit connected to the coil and including a diode for passing only one-half cycle of each pulse produced by the generator, a pair of transistors connected for monostable operation and connected across the diode for producing an output pulse of fixed length incident to each output pulse of the generator, a pair of series connected transistor inverter circuits for amplifying and shaping each output pulse of the first-mentioned transistors, and a power transistor connected to the output of the last inverter; and an electromagnetic stepping switch including a stepping magnet operated by the power transistor incident to each pulse of the electromagnetic generator.

15. In a conveyor control system of the type in which packages are placed on a conveyor for movement to selected discharge stations adjacent the conveyor path in which an address code assigned to a respective discharge station is placed into control apparatus for each package to cause the package to be removed from the conveyor at their respective discharge station and in which a photosensitive device detects the packages as they enter the first discharge station for transferring the address codes from a temporary nonsynchronous storage unit to a main memory device synchronized with the movement of the conveyor, the combination with the photosensitive device of a relay operated by the photosensitive device for preparing a circuit for causing the transfer of each address code from the temporary storage device to the main memory storage device, a capacitor connected across the relay to maintain the relay operated for a longer time interval, and a stepping switch synchronized with the movement of the conveyer including a magnet for completing the circuit for transferring each address code subsequent to the operation of the relay with wipers of the switch in a predetermined one of the wiper positions.

16. A conveyor control system of the type in which packages are placed on a conveyor for movement to selected discharge stations adjacent the path of the conveyor, in which each package has a binary address code assigned to its selected discharge station written into a multi-stage shift register for movement from stage to stage coincident with the movement of the package into conveyor path zones corresponding to the stages, in which a decoding circuit associated with each discharge station examines the address codes in a shift register stage corresponding to the zone in which the discharge station is located for the assigned address code, and in which transfer mechanism is operated by the decoder to remove packages at its associated discharge stations incident to the detection of the assigned address code in the corresponding shift register stage, wherein certain of the shift register stages include a section for receiving, storing and transferring each bit of an address code, each section comprising a pair of transistors connected for bistable operation with one or the other of the transistors conducting depending upon the value of the binary code bit stored therein, the output of each transistor being marked with one potential or another depending upon its conducting or nonconducting state, the output being connected to the corresponding section of the next succeeding shift register stage, an input circuit for each transistor connected to a respective output of the corresponding section of the next preceding shift register stage, said input circuits effective as the packages enter a next succeeding conveyor zone for momentarily storing the binary code bit from the corresponding section of the preceding shift register stage, and then for transferring the code bit into their respective section.

17. The system claimed in claim 16 wherein the sections of shift register stages corresponding to conveyor path zones having discharge stations located therein have one or the other of their outputs also connected to a respective one of a plurality of inputs to the decoder corresponding to the discharge station, depending upon which binary bit value is to be detected by the decoder input.

18. The combination claimed in claim 16 wherein each decoder comprises an AND circuit having an input for each code bit and having a synchronizing input effective upon movement of a package past a predetermined position relative to the transfer mechanism controlled by the decoder for examining the address code in the corresponding shift register stage.

19. In a conveyor control system of the type in which packages are placed on a transporting mechanism, each for movement to a selected one of a plurality of discharge stations adjacent a path traversed by the transporting mechanism, and in which transfer mechanisms selectively remove the packages from the transporting mechanism when they reach their selected discharge stations, the combination with the transporting and transfer mechanisms of a multi-stage shift register for storing and advancing package address codes assigned to the discharge stations coincident with the movement of the respective packages into conveyor path zones corresponding to the stages, and decoders connected to each shift register stage which stores an address code as its corresponding package passes a discharge station for examining the stages for assigned address codes and for operating the transfer mechanisms incident to the detection of assigned address codes, each shift register stage connected to a decoder including a section for receiving, storing and transferring each bit of an address code, each section comprising a pair of transistors connected for bistable operation with one or the other of the transistors conducting depending upon the value of a binary code bit stored therein, the output of each transistor being marked with one potential or another depending upon its conducting or nonconducting state, the output being connected to the corresponding section of the next succeeding shift register stage, a pair of input circuits for the transistors connected to the outputs of the corresponding section of the next preceding stage, and a pair of temporary storage devices interposed between the input circuits and the transistors, the input circuits effective as the packages enter next succeeding zones in the conveyor path for momentarily entering the binary code bit of the preceding shift register section in the temporary storage devices and for transferring the code bit into the transistors, one or the other of the transistor outputs being connected to a respective one of a plurality of inputs to the connected decoder depending upon which binary bit value is to be detected by the one decoder input.

20. In a conveyor system of the type in which an object intended for delivery to a predetermined ultimate destination is placed on a transporting mechanism for movement to a predetermined one of a plurality of discharge stations adjacent a path traversed by the transporting mechanism selected to correspond to the ultimate destination, in which control apparatus causes a transfer mechanism to selectively remove the object from the transporting mechanism when it reaches the predetermined discharge station, and in which a manually operable apparatus including a plurality of keys each corresponding to an ultimate object destination produces a destination code to condition the control apparatus for selectively controlling the transfer mechanism incident to the operation of the key corresponding to the predetermined ultimate destination, the combination with the manually operable apparatus and the control apparatus of a plurality of differently coded replaceable plug-in circuits one of which is controlled by the destination code to select the predetermined discharge station for removal of the object, whereby the discharge station selected for receiving packages intended for the predetermined ultimate destination may be varied at random.

21. In a mail sorting system of the type in which mail and parcel post packages are placed on a conveyor for movement to selected discharge stations adjacent a path traversed by the conveyor, in which control apparatus cause transfer mechanisms at the discharge stations to selectively remove the packages from the conveyor when they reach their selected discharge stations, and in which manually operable apparatus includes a plurality of keys, each corresponding to a common destination point for a different fixed geographic area, producing destination codes to condition the control apparatus for selectively controlling the transfer mechanisms, in combination with the manually operable apparatus and the control apparatus a plurality of interchangeable plug-in code circuits each controlled by a respective destination code to cause the control apparatus to selectively control a predetermined transfer mechanism, whereby the discharge stations selected for receiving packages intended for each geographic area may be varied at random.

References Cited in the file of this patent

UNITED STATES PATENTS

| 1,528,227 | Spooner | Mar. 3, 1925 |
| 2,379,828 | Rubidge | July 3, 1945 |
| 2,408,715 | Wilkerson | Oct. 1, 1946 |
| 2,825,476 | Muller | Mar. 4, 1958 |

FOREIGN PATENTS

| 741,124 | Great Britain | Nov. 30, 1955 |